US009541900B2

(12) United States Patent
Bang et al.

(10) Patent No.: US 9,541,900 B2
(45) Date of Patent: Jan. 10, 2017

(54) METHOD FOR PRODUCING A BEAM SHAPING HOLOGRAPHIC OPTICAL ELEMENT

(71) Applicants: LG Display Co., Ltd., Seoul (KR);
Bayer MaterialScience AG, Leverkusen (DE)

(72) Inventors: Hyungseok Bang, Goyang-si (KR); Heejin Im, Paju-si (KR); Guensik Lee, Seoul (KR); Friedrich-Karl Bruder, Krefeld (DE); Thomas Peter Fäcke, Leverkusen (DE); Marc-Stephan Weiser, Leverkusen (DE); Rainer Hagen, Leverkusen (DE); Thomas Rölle, Leverkusen (DE); Horst Berneth, Leverkusen (DE); Dennis Hönel, Zülpich (DE); Günther Walze, Köln (DE)

(73) Assignees: LG Display Co., Ltd., Seoul (KR); Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 14/140,914

(22) Filed: Dec. 26, 2013

(65) Prior Publication Data
US 2015/0185698 A1    Jul. 2, 2015

(51) Int. Cl.
*G03F 1/20*    (2012.01)
*G03H 1/20*    (2006.01)
(Continued)

(52) U.S. Cl.
CPC .............. *G03H 1/20* (2013.01); *G02B 5/0252* (2013.01); *G02B 5/0278* (2013.01); *G02B 5/32* (2013.01);
(Continued)

(58) Field of Classification Search
CPC .............. G03H 2001/0439; G03H 2001/0264; G03H 1/20; G03H 1/0402; G02B 27/0944
(Continued)

(56) References Cited

U.S. PATENT DOCUMENTS 3,716,286 A * 2/1973 St. John .................. G03H 1/10
                                                         348/41
4,416,505 A * 11/1983 Dickson .................. G03H 1/20
                                                         359/12
(Continued)

FOREIGN PATENT DOCUMENTS

CN          1956072 A      5/2007
CN        101681144 A      3/2010
(Continued)

OTHER PUBLICATIONS

Chinese First Office Action, Chinese Application No. 2014108958379.X, Aug. 30, 2016, 17 pages.

*Primary Examiner* — Bumsuk Won
*Assistant Examiner* — William R Alexander
(74) *Attorney, Agent, or Firm* — Fenwick & West LLP

(57) ABSTRACT

The present disclosure relates to a method for producing a beam shaping holographic optical element, which is configured to generate diffracted beams configured to reconstruct an image of a diffusor irrespectively of the point of impact of a pencil of light on the beam shaping holographic optical element, comprising providing a recording element, providing a master element comprising a particular pattern, forming a recording stack comprising the recording element and the master element such that the master element is arranged to the recording element in a closed-copy distance, irradiating at least a part of the recording stack with a reconstruction beam, irradiating at least a part of the recording stack with a reference beam, wherein at least one of the recon-
(Continued)

struction beam or reference beam penetrates the master element to record the pattern of the master element onto the recording element.

20 Claims, 17 Drawing Sheets

(51) Int. Cl.
    *G02B 27/09*     (2006.01)
    *G03H 1/02*     (2006.01)
    *G03H 1/04*     (2006.01)
    *G02B 27/01*     (2006.01)
    *G02B 5/02*     (2006.01)
    *G02B 5/32*     (2006.01)

(52) U.S. Cl.
    CPC ....... *G02B 27/0103* (2013.01); *G02B 27/0944* (2013.01); *G03H 1/02* (2013.01); *G03H 1/0402* (2013.01); *G03H 2001/0264* (2013.01); *G03H 2001/0439* (2013.01); *G03H 2222/18* (2013.01)

(58) Field of Classification Search
    USPC ........................................ 359/1, 3, 12; 430/1
    See application file for complete search history.

(56) References Cited

U.S. PATENT DOCUMENTS

| | | | |
|---|---|---|---|
| 5,550,779 A * | 8/1996 | Burr | ..................... G11C 13/042 359/15 |
| 5,600,454 A | 2/1997 | Trayner et al. | |
| 2005/0254108 A1* | 11/2005 | Chuang | .................... G03H 1/20 359/21 |
| 2005/0270609 A1* | 12/2005 | Chuang | .................... G11B 7/28 359/22 |
| 2008/0100890 A1* | 5/2008 | Curtis et al. | ....................... 359/3 |
| 2010/0165426 A1* | 7/2010 | Kihara | ................... G03H 1/265 359/3 |
| 2011/0261427 A1* | 10/2011 | Hart et al. | ...................... 359/22 |

FOREIGN PATENT DOCUMENTS

| | | |
|---|---|---|
| CN | 101794111 A | 8/2010 |
| CN | 102317873 A | 1/2012 |

\* cited by examiner

METHOD FOR PRODUCING A BEAM SHAPING HOLOGRAPHIC OPTICAL ELEMENT

BACKGROUND OF THE INVENTION

Field of the Invention

The present disclosure relates to a method for producing a beam shaping holographic optical element by providing a master element and a recording element. Especially, the present disclosure relates also to an arrangement for performing the method, a produced beam shaping holographic optical element and a display device comprising the produced beam shaping holographic optical element.

Discussion of the Related Art

Nowadays, liquid crystal displays are often used in electronic applications. Exemplified applications are mobile devices, game computers, tablet computers, monitors, television devices, advertising panels, and the like. Liquid crystal displays comprise a layer or panel with liquid crystals which can be driven electrically. In particular, the polarisation of the light illuminated by the display can be controlled depending on the voltage applied to the liquid crystals. Since these panels produce no light of their own a backlight unit has to be provided to illuminate the panels.

Thereby, a general concern is to provide a liquid crystal display having a high display quality. Factors of a high display quality are the colour space (Gamut), the homogeneity of the illumination, and the contrast relation. Future liquid crystal displays will also require a good steering quality e.g., for providing improved 3-D applications. Backlight units which enable a liquid crystal display to fulfill these requirements are backlight units comprising a beam shaping holographic optical element. A beam shaping holographic optical element is configured to illuminate a defined area at a defined distance from the beam shaping holographic optical element in a homogenous manner. For instance, the liquid display panel, a lens, a diffusor, or the like may be arranged at the defined area. In particular, by recording an element comprising any suitable recording material with a desired pattern, a beam shaping holographic optical element can be produced. It shall be understood that there are a plurality of further application requiring a beam shaping holographic optical element with good steering qualities, like signal lighting.

A particular important quality feature of a produced beam shaping holographic optical element is the steering quality. The steering quality or steering ability means that the beam shaping holographic optical element is able to reconstruct an identical real image of a diffusor independently of the impact location of a pencil of light that hits the beam shaping holographic optical element whereas the pencil of light emerges from a common source point.

A beam shaping holographic optical element in relation to the present disclosure is in particular a holographic optical element which transforms a spatially and/or directionally confined light source into a homogeneously illuminated area at a certain location in space. An important type of such a light source—but not exclusive in the sense of the present disclosure—is a pencil of intense laser light.

To transform the point-like cross section of this pencil of light for example in a plane rectangle with homogeneous brightness distribution at a certain location in space a beam shaping holographic optical element can be used. Such a beam shaping holographic optical element can work in transmission or in reflection geometry or in edge lit geometry and has to reconstruct the real image of a diffusor at the specified location in space in order to generate there the desired homogeneous brightness distribution.

However, the production of beam shaping holographic optical elements having a high quality and sufficiently geometric dimensions is difficult. One prior art approach and its problems will be described in the following with the aid of FIGS. 1 through 3.

FIG. 1 shows a conventional schematic view of an arrangement for producing a beam shaping holographic optical element.

Generally, to be able to reconstruct a real image with a beam shaping holographic optical element a reconstruction beam has to be the phase conjugate beam of the reference beam used for producing a beam shaping holographic optical element (Gerhard K. Ackermann and Jürgen Eichler "Holography a Practical Approach, Wiley VCH Verlag & Co. KGaA, Weinheim, 2007, Chapter 16. Pages 217-218).

FIG. 1 shows an exemplified recording scheme according to the prior art with an illumination beam 104 and a reference beam 103c. A convergent recording beam 103c is used as a reference beam 103c of the holographic recording setup for the present transmission-type beam shaping holographic optical element. The scheme in FIG. 1 is viewed from the top. After splitting the light beam emitted from a common laser light source by means of a suitable beam splitter, two spatial filters 105 generate the divergent illumination beam 104 for illuminating the object 101, for example a transparent diffusor, and the primarily divergent reference beam 103b.

After being reflected by the concave mirror 107, the primarily divergent reference beam 103b is transformed into a convergent reference beam 103c with a focus located at position 103d. The translucent object 101 generates the recording object beams 106b by diffraction. The object beams 106b interfere with the convergent reference beam 103c at the recording element 102. Element 102 is the element to be recorded with a desired pattern. By recording the recording element 102, the desired beam shaping holographic optical element is produced.

For reconstruction (see FIG. 2) of the real image 106a of the object 101 from FIG. 1, the (phase conjugated) reconstruction beam 103, diverging from a point in space 103a, is generated for example from a focused laser beam in combination with a spatial filter 105 positioned in this focal point. The beam shaping holographic optical element 102 then forms the diffracted beams 106 which form the real image 106a at its desired position.

A problem of the arrangement according to FIG. 1 is the required dimensions of the concave mirror 107 (or positive lens) configured to generate the converging reference beam 103c. The concave mirror 107 must always have larger lateral dimensions than the lateral dimension of the desired beam shaping holographic optical element 102 and the recording element 102, respectively. Thereby, the shorter the focal length—the distance between focal point 103d and the recording element 102—is, the larger the relative size of the concave mirror 107 (or positive lens) has to be compared to the beam shaping holographic optical element 102.

For instance, if the beam shaping holographic optical element 102 itself already has a large size (for example the size of an electronic display with 10" diagonal size or larger) the concave mirror 107 (or positive lens) has to be much larger than that. This means that the optical components, like mirrors or lenses, which can form the convergent reference beam, become very large and will be very expensive and/or difficult to manufacture. Other problems are the handling of such large and heavy components, their optical alignment and the stabilization and the footprint of the holographic recording setup.

Moreover, if the numerical aperture—the sine of the half of the opening angle of the convergent recording beam 103c in FIG. 1—or equivalent the field angle of the beam shaping holographic optical element 102 in FIG. 2 becomes very large such kind of focusing mirrors 107 and lenses with the necessary large diameter of the opening aperture and the respectively short focal length are virtually not available. An exemplary description of the meaning of numerical aperture is given in FIG. 3, which is the perspective view of the reference beam part given in FIG. 1. Here the numerical aperture is $\sin(\theta/2)$ in which the angle $\theta$ is measured in the plane that contains the largest diameter of the beam shaping holographic optical element 102.

All these difficulties apply also for reflection type beam shaping holographic optical elements or edge-lit type beam shaping holographic optical elements.

As mentioned above, on the one hand, high numerical aperture focusing mirrors 107 and lenses with the necessary large diameter of the opening aperture and the respectively short focal length are virtually not available, or expensive and extremely difficult to handle in a holographic recording setup.

On the other hand, objectives with a high numerical aperture are readily available and could be very cheap as they are already used in consumer devices which entered the mass market. For example a microscope objective of magnification 63× can have a numerical aperture of 0.75. Similarly an objective lens of a BluRay player pickup head has a numerical aperture of even 0.85. Precisely because these objectives will have a limited diameter of the input aperture of a few mm they are suited to generate a high quality divergent beam with the desired numerical aperture.

If the numerical aperture of the reference beam tends to zero the recording reference beam 103c in FIG. 1 and FIG. 3 tends to be a collimated beam and the mirror 107 (lens) is a collimating mirror (lens) with respect to the diverging beam 103b emerging from the pin hole 105. In this case the collimating mirror (lens) size could be reduced close or to its minimum size which is identical to the size of the beam shaping holographic optical element.

The phase conjugated beam of a collimated beam is also a collimated beam just with a reversed direction of propagation. That means to reconstruct the real image in the case of numerical aperture close to zero, instead of doing the readout with the collimated beam with reversed direction, the recorded hologram could be flipped and readout with the original collimated reference beam.

In WO 93/02372, a recording arrangement and method is described for a transmission type beam shaping holographic optical element. In a first step a master element in form of a master beam shaping holographic optical element is recorded with a collimated reference beam.

In a second step the master beam shaping holographic optical element is flipped and read out with the original reference beam used for recording the beam shaping holographic optical element. The real image which is reconstructed by this procedure is copied with a divergent reference beam into a new recording element. This recording element is arranged between the master beam shaping holographic optical element and the position of the reconstructed real image from the master beam shaping holographic optical element wherein the distance between the master element and the recording element is large. Reason for this position is to prevent the zero order light from the master beam shaping holographic optical element from hitting the holographic recording element used for the copy process. If the recorded or produced beam shaping holographic optical element is reconstructed with the divergent beam used as reference beam for the production or copying process the real image of the master beam shaping holographic optical element is reconstructed. As a collimated reference beam is used to record the master beam shaping holographic optical element and a divergent beam is used to record the copy beam shaping holographic optical element the minimum size of mirrors or lenses to from the reference beam can be achieved with the method of WO 93/02372.

However, the display quality, in particular, the steering ability of the produced beam shaping holographic optical element is low. If the produced beam shaping holographic optical element is hit by a pencil of light it strongly depends on the point of impact of the light whether the total real image is reconstructed or not.

SUMMARY OF THE INVENTION

Embodiments relate to a method for producing a beam shaping holographic optical element with an improved steering ability and a simple recording arrangement.

Embodiments relate to a method for producing a beam shaping holographic optical element. The holographic optical element generates diffracted beams configured to reconstruct an identical real image of a diffusor irrespectively of the point of impact of a pencil of light on the beam shaping holographic optical element. A recording element is provided. A master element comprising a particular pattern is provided. A recording stack comprising the recording element and the master element is formed such that the master element is arranged to the recording element in a closed-copy distance. At least a part of the recording stack with a reconstruction beam is irradiated. At least a part of the recording stack with a reference beam is irradiated. At least one of the reconstruction beam or reference beam penetrates the master element to record the pattern of the master element onto the recording element.

By forming the recording stack wherein the master element and the recording element are in closed-copy distance to each other, a beam shaping holographic optical element is produced having improved steering properties. The optical elements, like lenses and/or mirrors, have dimensions which are not (essentially) larger than the dimensions of the produced beam shaping holographic optical element.

A recording element, like a planar plate, is provided. The recording element is the element to be recorded by a desired pattern. After the recording, the recording element is the produced beam shaping holographic optical element.

The recording element comprises a suitable holographic optical material which can be recorded. The holographic optical material may be provided as a sheet material. By recording the recording element, in particular, the holographic optical material of the recording element, the beam shaping holographic optical element is produced.

Besides the recording element, a master element is provided. The master element comprises a particular pattern and image, respectively. The master element is configured such that by irradiating the master element with a reconstruction beam or the reference beam, the pattern of the master element can be mapped onto the recording element, as will be explained in detail hereinafter. The master element may be also a planar plate. According to a preferred embodiment, the master element and the recording element are rectangular plates having approximately the same dimensions, e.g., the same length and width.

For improving the steering ability of the beam shaping holographic optical element to be produced without reducing other display qualities, a recording stack, in particular, a closed-copy distance stack is formed. In particular, the master element and the recording element are arranged in closed-copy distance to each other. For instance, if the master element and the recording element are formed as plates, a large surface of the master element can directly face a large surface of the recording element. For instance, the distance between the two components is less than 1 mm, preferably less than 500 µm, in particular, less than 150 µm. Such a recording stack and copy stack, respectively, allow performing a contact copy process.

According to a method of embodiments, at least two beams, a reconstruction beam and a reference beam can be generated. For instance, one of the two (larger) surfaces of the copy stack is illuminated with the reference beam and the other surface is illuminated with the reconstruction beam for producing the beam shaping holographic optical element. Preferably, one of the surfaces is formed by the recording element and the other surface is formed by the master element. In a special case, only one surface of the copy stack, like a surface of the master element, will be illuminated (e.g., by the reference beam).

According to a first embodiment of the method according to the present disclosure, the reconstruction beam can be diffracted by the master element such that the resulting diffracted beam irradiates the recording element. The particular pattern of the master element may cause the reconstruction beam received by the master element to diffract in a desired manner. The diffracted beam illuminates the recording element. In particular, in the recording element, the diffracted beam interferes with the reference beam such that the particular image and pattern, respectively, is recorded into the recording element. In other words, by the interference of the two beams the beam shaping holographic optical element can be produced.

According to the present disclosure, the master element and the recording element are arranged within in recording stack such that a closed-copy process is possible. Particular good results can be achieved according to a preferred embodiment if the closed-copy distance between the recording element and the master element is less than 0.06 times, preferably less than 0.034 times, more preferably less than 0.0015 times and most preferable less than 0.0003 times the distance of the master element to a common source point of the pencils of light used for reconstruction of the pattern.

Generally, different components can be used for forming a master element. According to a preferred embodiment, the master element is a beam shaping holographic optical element. Generally, a recording element can be recorded with a desired pattern by a reference beam and an object beam generated by an illumination beam and an object, like a diffusor. The recorded element can be used as a master element. The recorded pattern of such a master element can be mapped or copied onto a recording element using a reference beam and a reconstruction beam. The reconstruction beam is a phase conjugated beam of the reference beam. Alternatively, according to a further preferred embodiment, the master element may be a Fresnel zone lens. In this case, the creation of a master element by recording a holographic optic element can be omitted. In both cases, for achieving good steering properties, the master element must be in closed-copy distance to the element to be recorded.

Furthermore, in another preferred embodiment, the reconstruction beam is a collimated beam. Additionally or alternatively, the reconstruction beam is a phase conjugated beam of a reference beam which has been used for recording the master element. This enables to copy a desired pattern of a master element onto a recording element in a simple manner. Furthermore, the reference beam is preferably a divergent beam.

The recording element can comprise any suitable recording material. In preferred embodiments, the recording element may comprise a photoresist material, photopolymer material, silver halide material, di-chromated gelatine material photo-chromic material or photo-refractive material.

In particular, the recording element may preferably comprise a photopolymer film comprising a cross-linked matrix and writing monomers, preferably comprising a cross-linked matrix and acrylate based monomers. Such a material is particular suitable for forming a beam shaping holographic optical element.

Moreover, the recording element can comprise a stack of (different) layers. According to a preferred embodiment, the recording element may comprise a glass plate. In particular, the glass plate may be a float glass plate. The float glass can form an outer surface of the recording element. Furthermore, the previously described photopolymer film may be laminated to the glass plate. The glass plate may act as a support layer. It shall be understood that the recording element may comprise further layers. A compact design of an element to be recorded can be provided.

According to a preferred embodiment, the recording element can be arranged in the recording stack such that the glass plate of the recording element is irradiated by the reference beam. In other words, the reference beam can enter the recording stack via the glass plate of the recording element.

Additionally or alternatively, the recording element can be arranged in the recording stack such that the photopolymer film of the recording element is irradiated by the diffracted beam which has been generated by illuminating the master element with the reconstruction beam. In other words, the diffracted beam can enter the recording element via the photopolymer film of the recording element.

In case the master element is also a beam shaping holographic optical element comprising a desired pattern, the structure of the master element may be similar to the structure of the recording element. More particularly, the master element may comprise a glass plate and photopolymer film. In this case, the photopolymer film of the master element and the photopolymer film of the recording element can preferably face each other. The two glass plates may form the outer surfaces of the recording stack. The reference beam may enter the recording stack via the glass plate of the recording element. The reconstruction beam may enter the recording stack via the glass plate of the master element. In such an arrangement, it is preferred that the two photopolymer films do not contact each other directly. The gap between the two layers may be filled with a suitable immersion fluid. This compact design of a recording stack is particular suitable for producing recorded beam shaping holographic optical elements having good steering properties with an improved processing time. In particular, there is no need to provide optical elements, like mirrors or lenses, having a diameter larger than the beam shaping holographic optical element. The diameter of the employed optical elements may be approximately equal to the diameter of the beam shaping holographic optical element.

Furthermore, the reference beam and the reconstruction beam are preferably generated by the same light source. The light source may comprise more than one light generator, like three monochromatic lasers which are superimposed by suitable optical elements. A light beam splitter can be configured to split the beam emitted from the light source into the reference beam and the reconstruction beam. Two beams having the same properties (e.g., wavelength) can be generated in a simple manner. According to another embodiment, at least one of the reference beam or reconstruction beam can be generated by a laser, a laser diode or a directional light source.

A further aspect of the present disclosure is an arrangement for performing the previously described method. The arrangement comprises at least one beam source for generating a reconstruction beam and a reference beam. The arrangement comprises a recording holder for holding a recording stack comprising a recording element and a master element, wherein the master element is in a closed-copy distance to the recording element.

This recording arrangement allows performing the above described method for producing a desired beam shaping holographic optical element without the need of lenses or mirrors which are much larger than the beam shaping holographic optical element to be recorded and produced, respectively.

Another aspect of the present disclosure is a beam shaping holographic optical element produced by the previously described method.

In a preferred embodiment of the beam shaping holographic optical element according to the present disclosure, the beam shaping holographic optical element may be a reflection-type beam shaping holographic optical element, a transmission-type beam shaping holographic optical element or an edge-lit beam shaping holographic optical element or a combination of thereof.

A further aspect of the present disclosure is a display device comprising the previously described beam shaping holographic optical element. Preferably, the display device may be a liquid crystal display device. For instance, the display device may be a mobile device, a game computer, a tablet computer, a stand-alone monitor, a television device, an advertising panel, or the like.

These and other aspects of the present patent application become apparent from and will be elucidated with reference to the following figures. The features of the present application and of its exemplary embodiments as presented above are understood to be disclosed also in all possible combinations with each other.

BRIEF DESCRIPTION OF THE DRAWINGS

The accompanying drawings, which are included to provide a further understanding of the present disclosure and are incorporated in and constitute a part of this specification, illustrate embodiments of the present disclosure and together with the description serve to explain the principles of the present disclosure.

DETAILED DESCRIPTION OF THE ILLUSTRATED EMBODIMENTS

Figure 1:
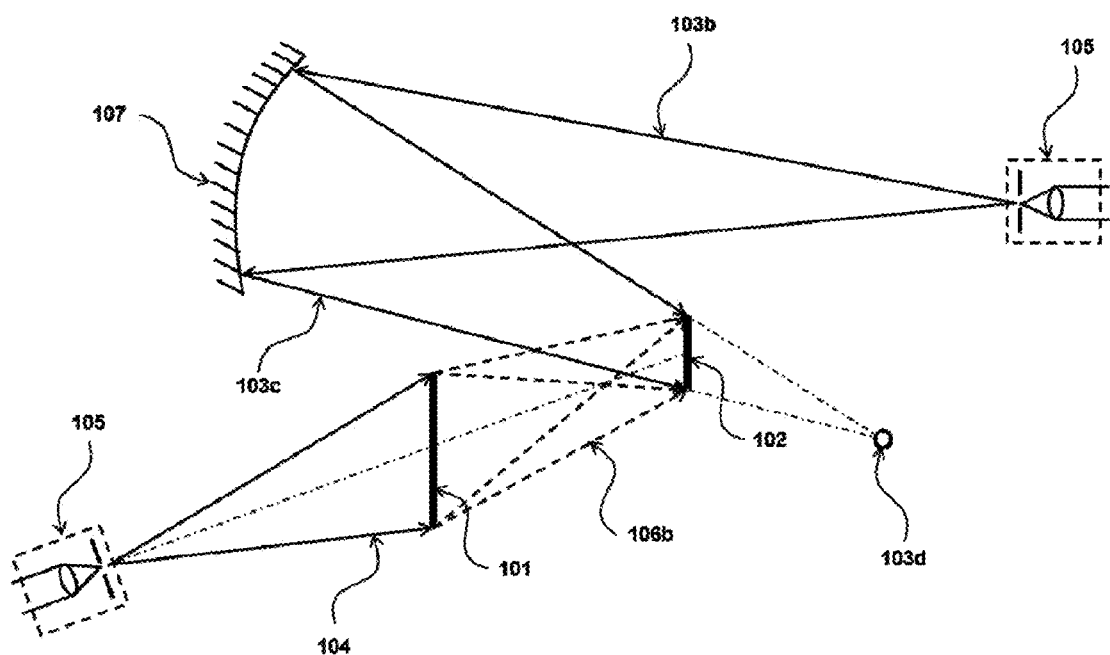
FIG. 1 is a schematic view of a conventional arrangement for producing a beam shaping holographic optical element.
Figure 2:
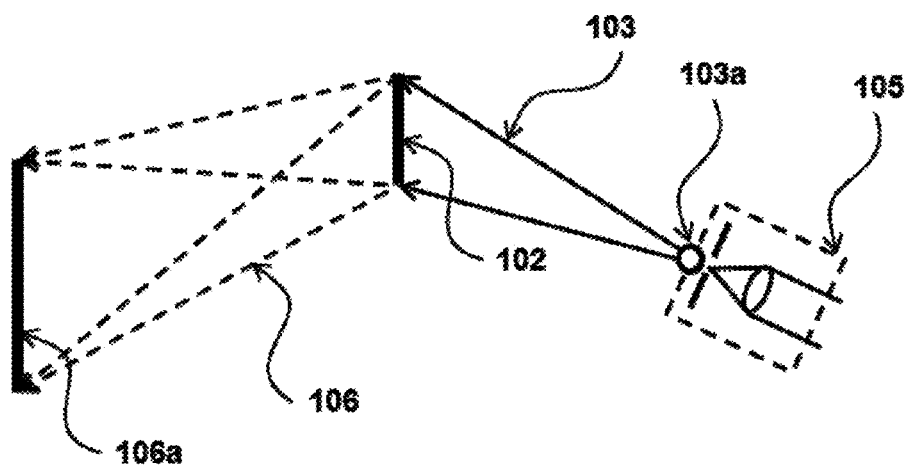
FIG. 2 is a schematic view of an arrangement for reconstruction of the real image of the object of FIG. 1.
Figure 3:
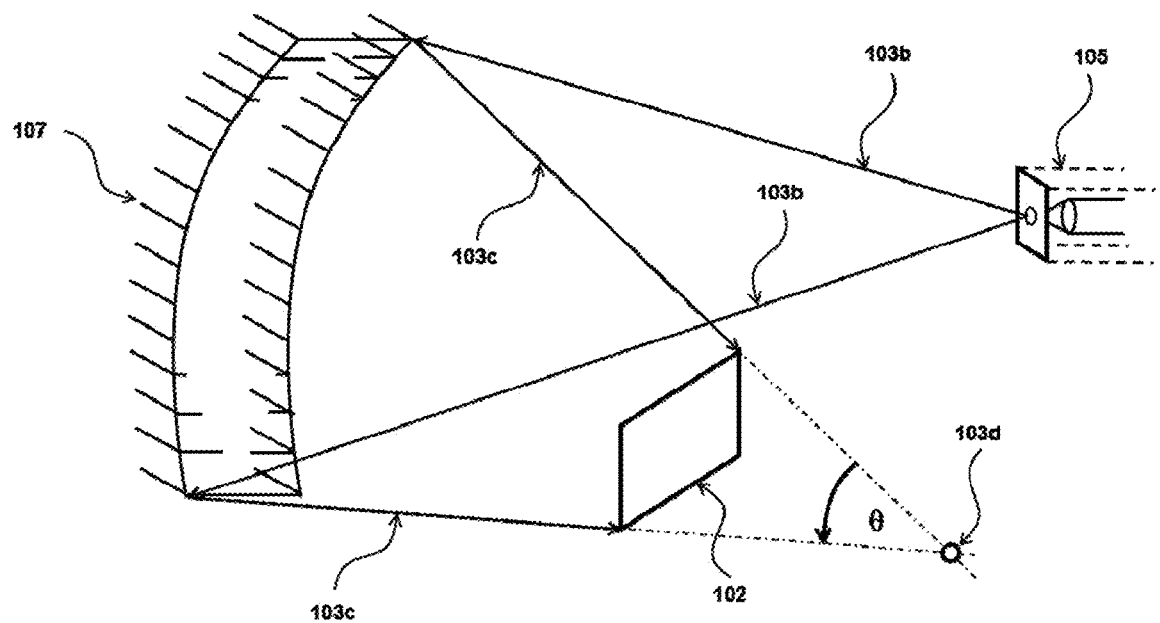
FIG. 3 is a schematic view of an arrangement for producing a beam shaping holographic optical element according to prior art, wherein only the reference beam part is depicted.

Referring to attached figures, preferred embodiments of the present disclosure will be described. Like reference numerals designate like elements throughout the detailed description. However, the present disclosure is not restricted by these embodiments but can be applied to various changes or modifications without changing the technical spirit. In the following embodiments, the names of the elements are selected for ease of explanation and may be different from actual names.

Figure 4:
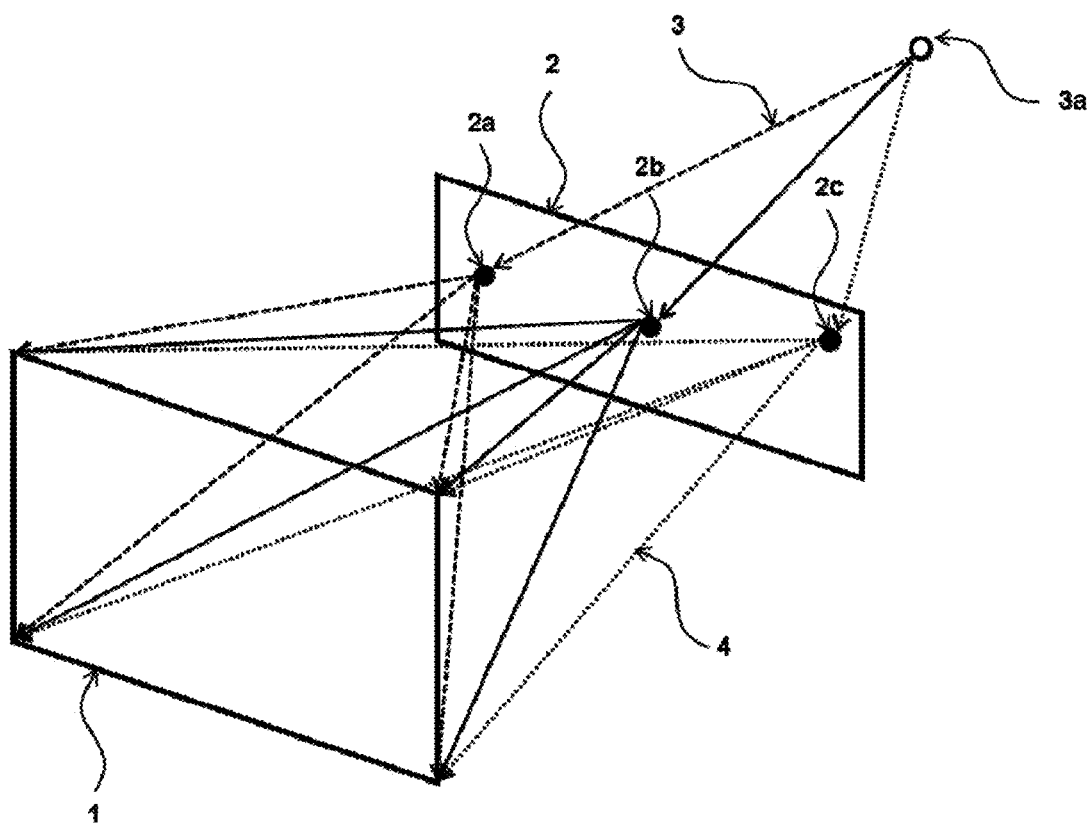
FIG. 4 is a schematic view of an embodiment of a transmission type beam shaping holographic optical element according to the present disclosure.

FIG. 4 shows a first exemplified embodiment of a beam shaping holographic optical element 2 according to the present disclosure. In the present embodiment, the beam shaping holographic optical element 2 is a transmission type beam shaping holographic optical element 2.

As can be seen from FIG. 4, a pencil of light 3 emerges from a common source point 3a and hits the beam shaping holographic optical element 2 in one of the exemplified spots 2a, 2b or 2c. Irrespective of the position of the illuminated spot 2a or 2b or 2c on the beam shaping holographic optical element 2, the identical real image of a diffusor 1 is reconstructed by the respective diffracted beams 4. FIG. 4 shows examples of those subsets of diffracted beams which build the corners of the reconstructed image.

Figure 5:
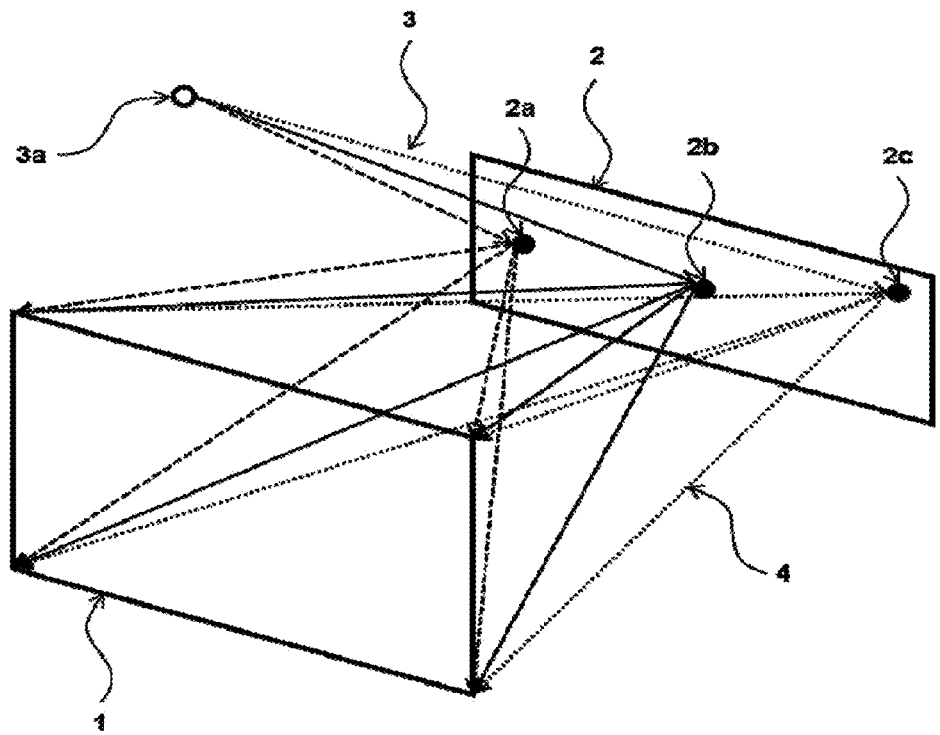
FIG. 5 is a schematic view of a further embodiment of a reflection type beam shaping holographic optical element according to the present disclosure in combination with further optical elements which utilize the steering capability of the beam shaping holographic optical element.

FIG. 5 shows a further embodiment of a beam shaping holographic optical element 2 according to the present disclosure. The depicted beam shaping holographic optical element 2 is a reflection type beam shaping holographic optical element 2. In the reflection type beam shaping holographic optical element the common source point 3a is on the same side as the real image of the diffusor 1 with respect to the beam shaping holographic optical element 2, whereas in the transmission type the common source point 3a is on the opposite side as the real image of the diffusor 1 with respect to the beam shaping holographic optical element 2 (see FIG. 4). As can be generally seen from FIGS. 4 and 5, the beam shaping holographic optical element 2 may be a plate having a rectangular shape.

Such a beam shaping holographic optical element 2 can be utilized, for example, in many optical applications in which a homogeneous illumination of a certain area at a specific location in space is needed. The light source 3a is a strong light spot on the area of the beam shaping holographic optical element and the amount of light emitted from this point to this specific area can be controlled by the diffraction efficiency of the beam shaping holographic optical element. This means it can be close to 100% if volume phase holograms are used. For instance, such a beam shaping holographic optical element can be used, for example, in display applications for very efficient and polarization conserving light homogenization of intense point light sources as, for example, in backlight units of liquid crystal type displays.

Moreover, by steering the pencil of light 3 emitted from the common source point 3a to the different positions (e.g., 2a or 2b or 2c) onto the beam shaping holographic optical element 2, the location of the so formed point light sources 2a, 2b or 2c on the beam shaping holographic optical element can be changed without changing the shape and location of the homogeneously illuminated area 1.

Figure 6:
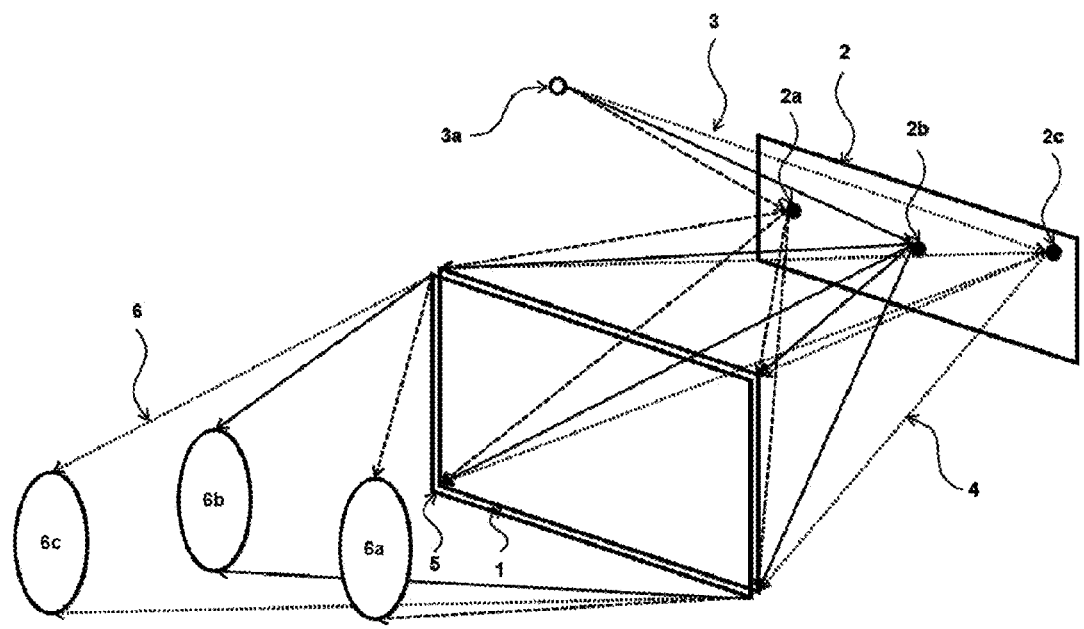
FIG. 6 is a schematic view of a further embodiment of a beam shaping holographic optical element according to the present disclosure.

If another optical element 5 (see FIG. 6), like for example a lens, a mirror or another holographic optical element, is placed at the location of the homogeneously illuminated area 1, the different positions 2a or 2b or 2c on the beam shaping holographic optical element 2 will act as different object points for the imaging properties of the specific optical element 5. If, for example, the different positions 2a or 2b or 2c on the beam shaping holographic optical element 2 are addressed in a time sequential manner a dynamic steering of the respective image positions 6a or 6b or 6c generated by the specific optical element 5 can be realized.

The beam shaping holographic optical elements 2 can be advantageously used for realizing highly efficient complex dynamic optical systems, which require a homogenous illumination of a confined area utilizing strong and intense directional light sources, like laser diodes.

In the following, the method for producing a beam shaping holographic optical element will be explained. The recording element, which is recorded to produce the beam shaping holographic optical element, may comprise a suitable holographic medium. For instance, as a holographic recording medium photopolymer films comprising a cross-linked matrix and writing monomers, preferably comprising a cross-linked matrix and acrylate based monomers can be used. In the present example, the photopolymer layer has a thickness of approximately 22 μm. It shall be understood that the thickness may be higher or lower depending on e.g. the application purpose.

The photopolymer layer can be coated on a transparent thermoplastic film. The transparent thermoplastic film may be e.g. 60 μm thick. For instance, an amorphous polyamide film Transphan® OG 622 GL manufactured by LOFO HIGH TECH FILM GMBH can be used. It shall be understood, that other materials can be employed as well.

Figure 7:
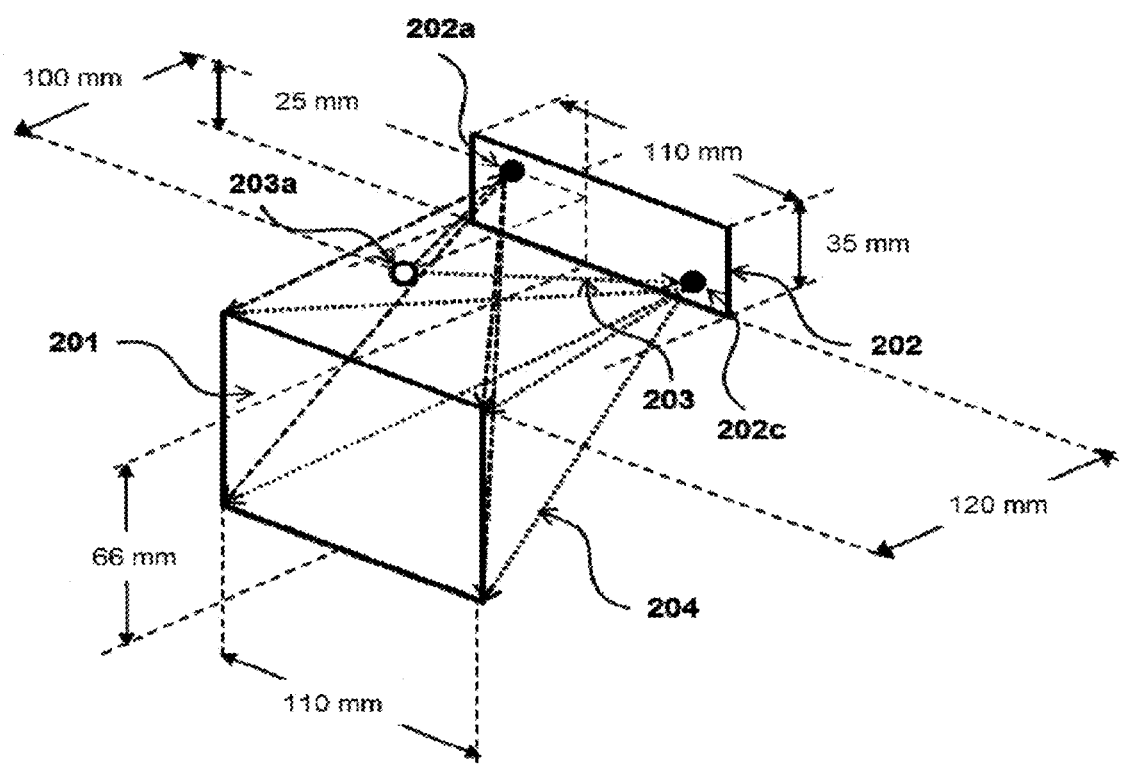
FIG. 7 is a schematic view of an embodiment of a beam shaping holographic optical element according to the present disclosure.
Figure 8:
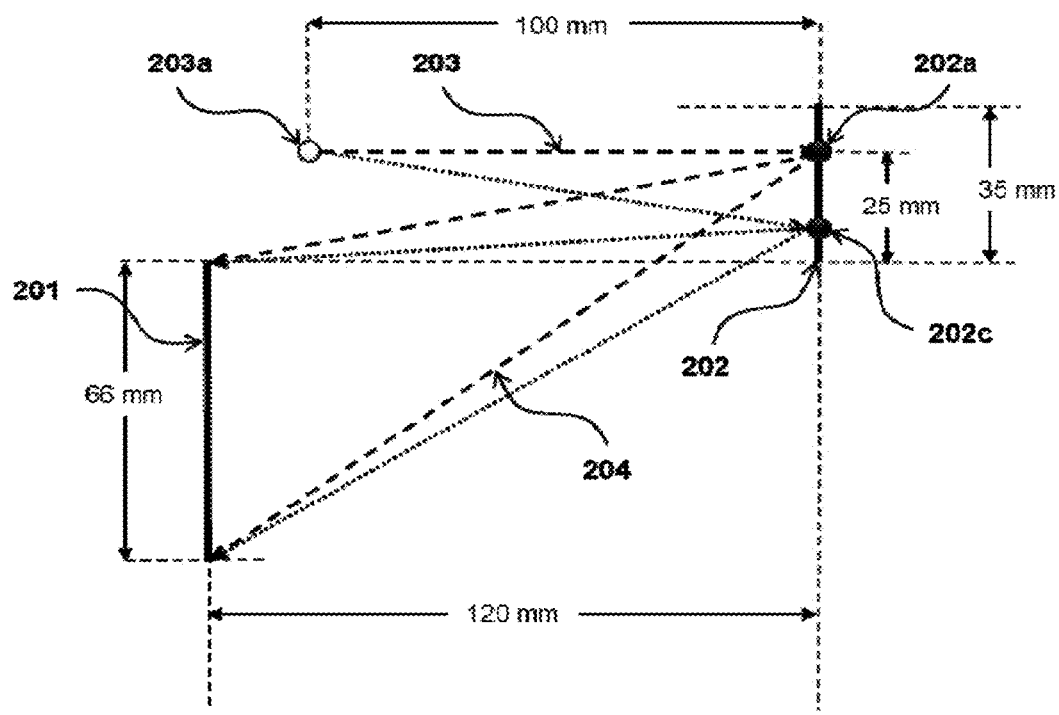
FIG. 8 is a schematic side view of the embodiment shown in FIG. 7.

FIG. 7 shows a perspective view of the reconstruction geometry of an off side, reflection type beam shaping holographic optical element 202. FIG. 8 shows a side view of the reconstruction geometry of the same beam shaping holographic optical element 202. As can be seen from FIGS. 7 and 8, the embodiments are provided with exemplified dimensions.

The mode of action for this off side, reflection beam shaping holographic optical element 202 shown in FIGS. 7 and 8 is as follows:

As already described with regard to FIG. 4, a pencil of light 203 emerges form a common source point 203a, like a laser source, and hits the beam shaping holographic optical element 202, for example, in one of the spots 202a or 202c. Irrespective of the position of the illuminated spot (either 202a or 202c or any other spot) on the beam shaping holographic optical element 202, the identical real image of a diffusor 201 is reconstructed by the respective diffracted beams 204. The numerical aperture of the depicted beam shaping holographic optical element 202 is sin (30.24°) ~0.5. In other words, the numerical aperture is high.

The recording and the reconstruction of the beam shaping holographic optical element 202 is possible with red, green and blue light.

Figure 9:
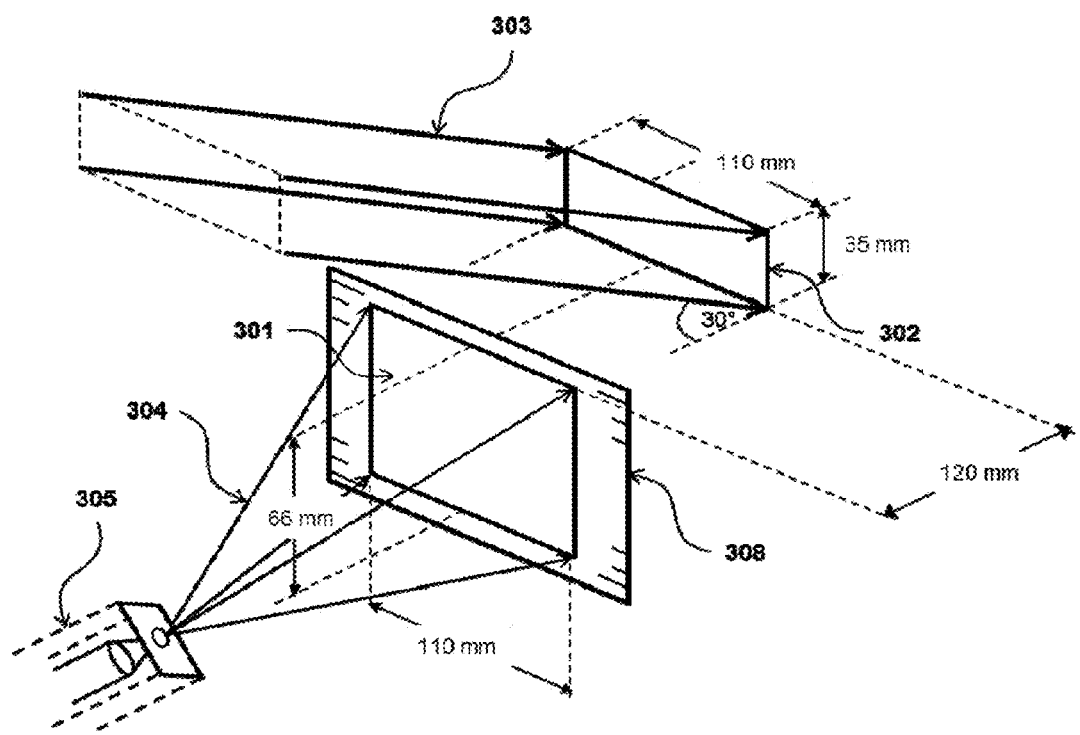
FIG. 9 is a schematic view of an embodiment of an arrangement for generating a master element in form of a master beam shaping holographic optical element according to the present disclosure.
Figure 10:
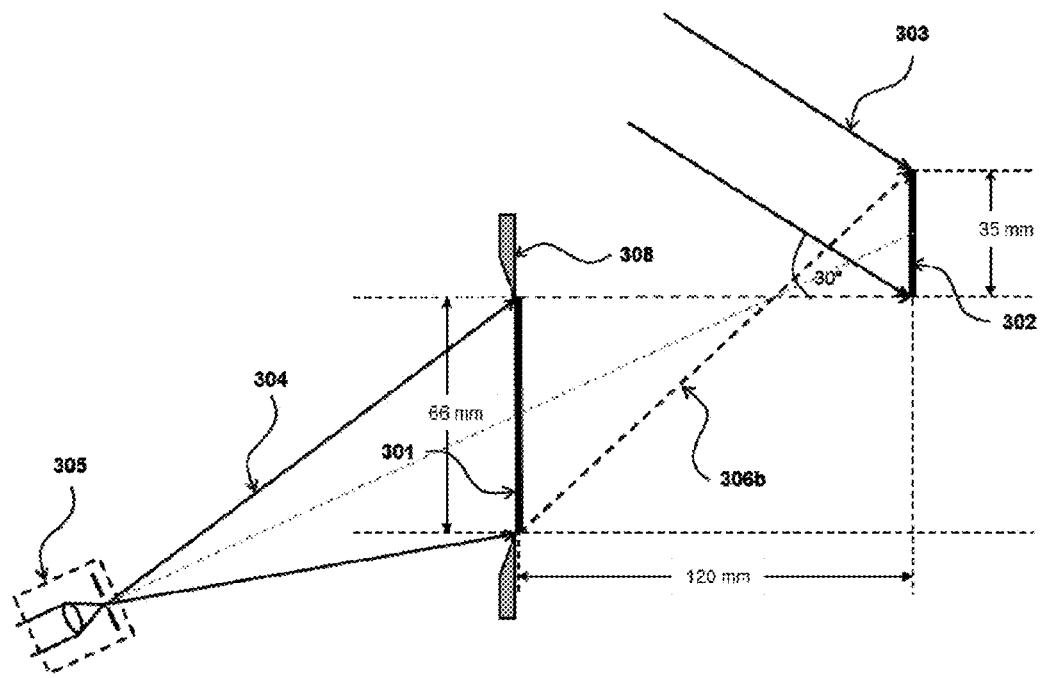
FIG. 10 is a schematic side view of the embodiment shown in FIG. 9.

FIG. 9 shows a perspective view (not to scale) of the recording geometry of the transmission type master beam shaping holographic optical element 302. FIG. 10 shows a side view (to scale) of the recording geometry of this beam shaping holographic optical element 302. Similar to FIGS. 7 and 8, the dimensions of the respective arrangements are given in the FIGS. 9 and 10.

From a common laser light source after a suitable beam splitter the spatial filter 305 can generate the divergent illumination beam 304 for the object 301. The object itself may be a diffusor sheet (Makrofol® LM 322 2-4, 300 μm thick, made by Bayer MaterialScience AG) made from polycarbonate. It shall be understood that other materials can be used.

The respective opening of 66 mm by 110 mm can be generated by a mask 308 of respective aperture. The optical axis of the illumination light can be aligned along the centres of the object 301 and the recording element 302. The object beam 306b, a diffuse light beam 306b, generated by the object 301 (most effectively) covers the area of the recording master element 302. A collimated reference beam 303—which is generated by using e.g. a folding mirror, as described in accordance with FIG. 1, is directed at an angle of 30° on the recording element 302 with respect to its surface normal. The active diameter of this folding mirror can be chosen equal to the diameter of the recording plate 302 as its minimum value. In the present example, the diameter is equal to 115.43 mm.

The collimated reference beam 303 and the divergent illumination beam 304 used for generating the object beam 306b can be preferably generated from a super-position of red, green and blue laser co-aligned light.

The recording element 302 can preferably comprise a float glass plate. The float glass plate may have a thickness of approximately 3 mm. The lateral dimension of the float glass may be 90 mm by 120 mm. It shall be understood that other dimensions can also be chosen. A photopolymer film can be laminated with the photopolymer layer towards the glass surface. The substrate side of the photopolymer film can be directed towards the other side, which may be air. Preferably, the recording element 302 can be oriented with the photopolymer film side towards the collimated reference beam 303. The substrate side of the photopolymer film can face the air. The collimated reference beam 303 may thus enter the recording element 302 via the photopolymer film.

The real image of this transmission type master beam shaping holographic optical element is identical to the real image that should be reconstructed by the reflection type beam shaping holographic optical element from FIGS. 7 and 8 if it is illuminated by a pencil of light that emerges from the common source point 203a given in FIGS. 7 and 8.

Figure 11:
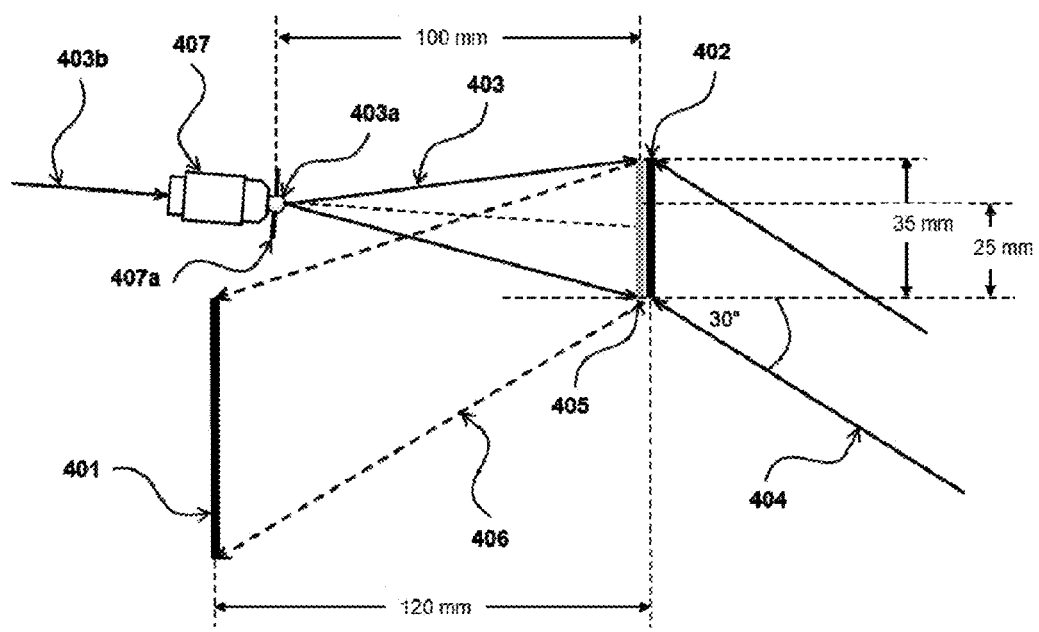
FIG. 11 is a schematic view of an embodiment of an arrangement for generating a beam shaping holographic optical element according to the present disclosure.

FIG. 11 shows a schematic view of an embodiment of an arrangement for generating a beam shaping holographic optical element 405 according to the present disclosure. In particular, a side view (to scale) of the recording geometry of the beam shaping holographic optical element 405 is shown. Exemplified and not limiting dimensions are given in FIG. 11.

As can be seen from FIG. 11, a recording stack is formed by the recording element 405 and the master element 402. The recording stack is irradiated by a reconstruction beam 404. The reconstruction beam 404 is a collimated beam. In particular, the reconstruction beam 404 is the phase conjugated beam of the collimated beam 303 from FIGS. 9 and 10 which has been used for recording the master beam shaping holographic optical element 402 with a desired pattern. The reconstruction beam 404 is configured to reconstruct the real image 401 of the master beam shaping holographic optical element 402 at its desired final position via the diffracted beams 406. In other words, the reconstruction beam 404 penetrates the master beam shaping holographic optical element 402. Depending on the recorded pattern of the master beam shaping holographic optical element 402, a diffracted beam 406 is generated by diffraction.

The present master beam shaping holographic optical element 402 may be the exposed recording plate 302 from the master beam shaping holographic optical element recording scheme depicted in FIG. 9 and FIG. 10.

The recording element 405 and the master element 402 form a recording stack, in particular, a closed-copy distance recording stack. The unexposed recording element 405 or copying plate 405 is placed in closed-copy distance to the master beam shaping holographic optical element 402. In other words, the distance between the recording element 405 and the master element 402 is less than 0.06 times, preferably less than 0.034 times, more preferably less than 0.0015 times and most preferable less than 0.0003 times the distance of the master element 402 to a common source point of the pencils of light used for reconstruction of the recorded pattern. Preferably, the master element 402 and the recording element 405 are not in a direct contact. For instance, the gap between both components may be filled by a suitable immersion fluid. The recording element 405 may be arranged to the master element 402 at its side which is opposite to the incident reconstruction beam. The diffracted beam 406 generated by the master element 402 forms the object beam for the closed-copy process into the recording plate 405.

Furthermore, the other surface of the recording element 405 is irradiated by a reference beam 403. The reference beam 403 may be a divergent beam 403. The reference beam 403 for the copy process may be formed from co-aligned red, green and blue unexpanded laser beams via a microscope objective 407, like the ZEISS LD Plan-NEOFLUAR 63×/NA=0.75 Korr., with its focus located in the common source point 403a.

The numerical aperture of the microscope objective 407 may be larger than the numerical aperture of the beam shaping holographic optical element 402. A pin-hole 407a can be preferably used to filter the reference beam 403. The optical axis of the microscope objective 407 and therefore that of the divergent reference beam 403 can be directed towards the centre of the recording element 405.

The recording element 405 may be a recording plate 405. The recording plate may be comprised of a stack of a 3 mm float glass plate with lateral dimension of 90 mm by 120 mm and photopolymer film and a photopolymer film laminated with the photopolymer layer towards the glass surface. The substrate side of the photopolymer film may be directed towards the air. It shall be understood that the dimensions and the structure are merely given as examples.

The copying stack may be comprised of the recording element 405 and the master element 402. The photopolymer substrate sides of both elements 405 and 402 are preferably facing each other in the present example. The entrance surface of the reconstruction beam 404 into the copying stack may be preferably the glass surface of the master element 402. The entrance surface into the copying stack of the divergent reference beam 403 may be the glass surface of the recording element 405.

The distance d between the master element and the recording layer of the recording element may be preferably at most twice the substrate thickness of the photopolymer film. In the present example, the distance may be 60 μm+60 μm=120 μm. The distance D of the recording element 405 to the common source point of the pencils of light used for reconstruction may be 100 mm. The ratio d/D is 0.0012 in the present example.

Figure 12:
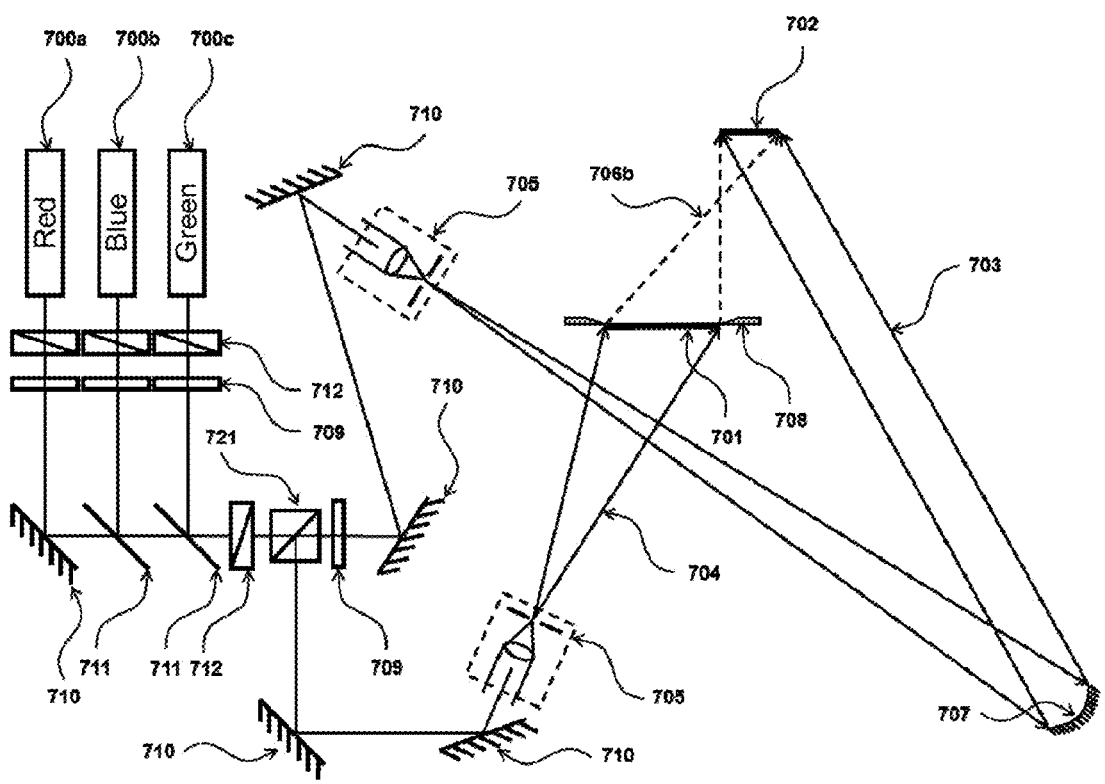
FIG. 12 is a schematic view of a further embodiment of an arrangement for generating a master element in form of a master beam shaping holographic optical element according to the present disclosure.

FIG. 12 shows a further embodiment of an arrangement for producing a master beam shaping holographic optical element 702 according to the present disclosure.

Reference sign 700*a* denotes a red laser, reference sign 700*b* denotes a blue laser, and reference sign 700*c* denotes a green laser as light source. For the red laser 700*a* a Krypton Ion laser (Coherent, Innova Sabre) 700*a* with a specified output power of 2.1 Watt at 647 nm in single frequency mode can be used. For the green laser 700*b* a DPSS laser (Coherent Verdi V5) 700*b* with a specified output power of 5 Watt at 532 nm in single frequency mode can be used. Finally, for the blue laser 700*c* an Argon Ion laser (Coherent, Innova 305) 700*c* with a specified output power of 0.9 Watt at 488 nm can be used.

Furthermore, individual shutters 712 configured for blocking a laser beam are provided. In particular, each of these lasers can be blocked by individual shutters 712 directly after the laser output. In addition, a main shutter 712 may be provided. The main shutter 712 may be configured to control the simultaneous exposure time texp for all three laser wavelengths.

The beam ratios (BR) between the power density of the reference beam Pref and the object beam Pobj of each individual laser wavelength $\lambda$ could be adapted with the half wave plates 709 located after the individual shutters 712 and the polarizing beam splitter 721. Thereby, the beam ration BR is defined as follows:

$$BR = Pref/Pobj \qquad (a)$$

Pref and Pobj can be measured with photodiode sensors at the location of the recording master element 702 with the sensor planes aligned parallel to the recording master element 702. In the present example, the polarizations of all recording beams are set to S-polarization with respect to the recording table.

The three laser beams are co-aligned by the aid of one mirror 710 and two diachronic mirrors 711. It shall be understood that other means can be used. The reference beam 703 is expanded by a spatial filter 705 and directed on a spherical mirror 707. In the present example, the focal length is set to 3 m. The pin hole of the spatial filter 705 is preferably placed into the focal point of the spherical mirror 707. The spatial filter 705 and the spherical mirror 707 are configured to generate the collimated reference beam 703.

In a practical test, the collimation was confirmed by using a shear beam interferometer (Melles Griot, Shear Plate). In the test, the collimated reference beam 703 is directed at a 30° incidence angle towards the surface normal of the recording master plate 702. The object wave 706*b* and object beam 706*b*, respectively, is generated by the diffusor 701 which is illuminated by the divergent illumination beam 704. The divergent illumination beam 704 is generated by another spatial filter 705. The following recording parameters have been used in the test:

$\lambda$=647 nm: Pref=59.4 µW/cm2 Pobj=5.2 µW/cm2 BR=11.4
$\lambda$=532 nm: Pref=59.6 µW/cm2 Pobj=8.1 µW/cm2 BR=7.4
$\lambda$=488 nm: Pref=60.0 µW/cm2 Pobj=5.0 µW/cm2 BR=12.0
texp=60 s The recorded master element 702 and the recorded master plate 702, respectively, now form the master beam shaping holographic optical element 702. The master beam shaping holographic optical element 702 can be preferably bleached twelve hours on a light box to remove residual coloration from the photo-initiator system.

In the test, to estimate the efficiency $\eta$ the recorded master beam shaping holographic optical element 702 is flipped and placed back on the employed recording plate holder. Then the reference beam 703 is used as reconstruction beam. The incident power density Pin is measured for each laser wavelength $\lambda$. Furthermore, the diffracted power density Pdiff is measured for each laser wavelength $\lambda$ at the position of the real image of the diffusor. The efficiency $\eta$ is then calculated for each $\lambda$ by following equation:

$$\eta = (Pdiff/Pin)*(\text{Area of the real image of the diffusor})/(\text{Area of the master element}) \qquad (b)$$

The following results are found:
$\lambda$=647 nm: $\eta$=0.58
$\lambda$=532 nm: $\eta$=0.59
$\lambda$=488 nm: $\eta$=0.50

As can be seen from the above results, the master beam shaping holographic optical element 702 shows balanced efficiencies for all three colours.

After producing in a first step the master beam shaping holographic optical element 702, the master beam shaping holographic optical element 702 can be used for producing beam shaping holographic optical elements in a second step. In particular, by arranging the generated master element 702 in closed-copy distance to the holographic element to be recorded, a beam shaping holographic optical element can be produced having improved steering abilities. The second step will be described in detail with the aid of FIG. 13.

Figure 13:
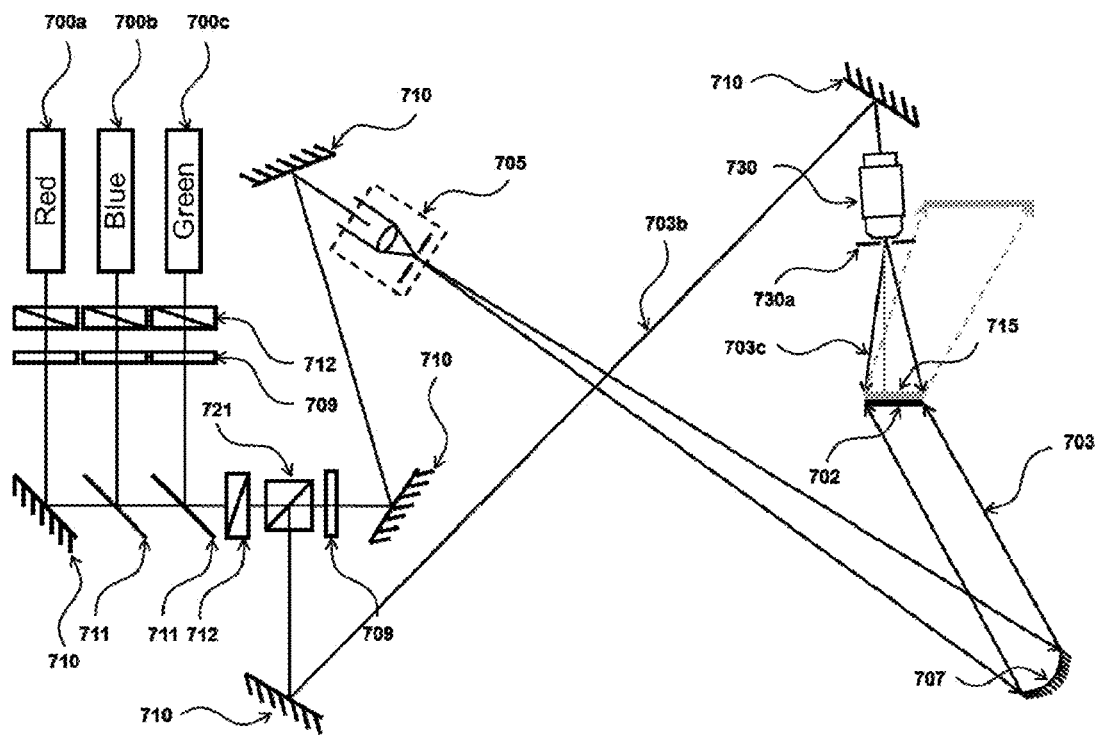
FIG. 13 is a schematic view of a further embodiment of an arrangement for generating a beam shaping holographic optical element according to the present disclosure.

The arrangement in FIG. 13 corresponds essentially to the arrangement shown in FIG. 12. For avoiding repetitions, it is therefore referred to the above explanations and only the differences will be elucidated in the following.

The recoding element 715 is attached to the master element 702 to form the contact copy stack. In particular, the master element 702 is in closed-copy distance with the recording element 715. The spatial filter 705 and the spherical mirror 707 are configured to generate the reconstruction beam 703. Preferably, the phase conjugated beam of the former reference beam 703 (FIG. 12) for recording the master element 702 is the reconstruction beam 703.

Furthermore, compared to FIG. 12, the further spatial filter 705 for generating the divergent beam 704 has been removed. In the present example, the beam 703*b* is directed through the microscope objective 730 and filtered by a pin-hole 730*a* to from the spherical reference beam 703*c* for the contact copy process. In a practical test, the following recording parameters are used:

$\lambda$=647 nm: Pref=100.0 µW/cm2 Prec=30.5 µW/cm2 BRC=3.3
$\lambda$=532 nm: Pref=160.0 µW/cm2 Prec=47.5 µW/cm2 BRC=3.4
$\lambda$=488 nm: Pref=178.0 µW/cm2 Prec=55.5 µW/cm2 BRC=3.2
texp=50 s The power density of the reconstruction beam Prec at the entrance surface to the recording element 715 can be estimated as follows. The power density P0 is measured with a photodiode sensor in the centre of the real image of the diffusor, reconstructed by the master element 702 and then multiplied by the area factor that accounts for the beam cross section expansion according to following equation:

$$Prec = P0*(\text{Area of the real image of the diffusor})/(\text{Area of the master element}) \qquad (c)$$

The power density of the reference wave Pref is measured with photodiode sensors at the centre of opposite entrance surface of the recording element 715 with the sensor planes aligned parallel to the copy element 715. The beam ratio of the contact copy process is defined as follows:

$$BRC = Pref/Prec \qquad (d)$$

The recording element 715 can be bleached twelve hours on a light box to remove residual coloration from the photo-initiator system.

Figure 14:
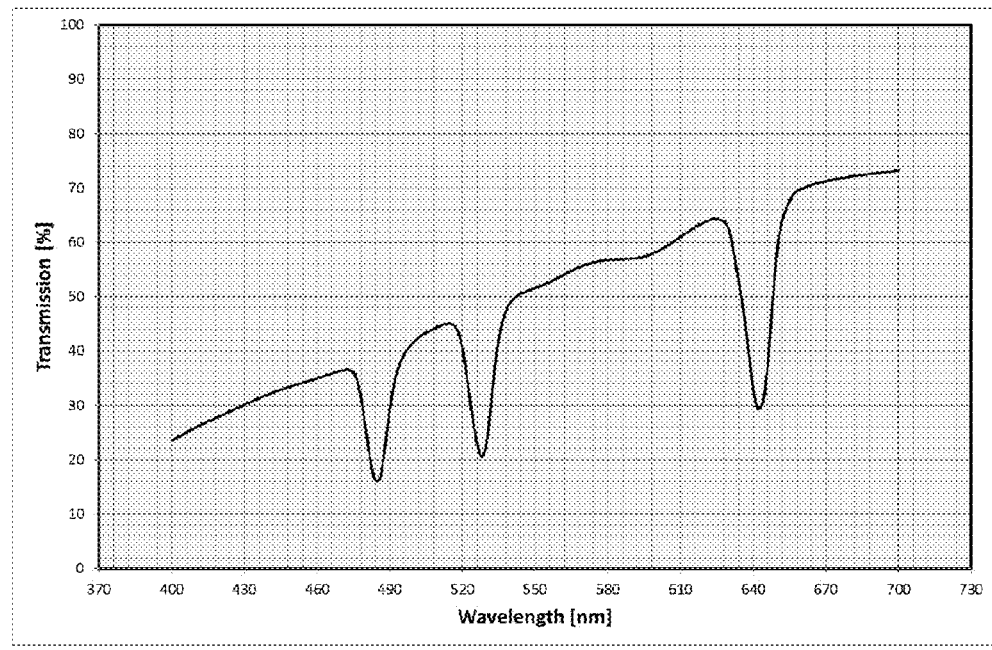
FIG. 14 is a diagram with test results of a beam shaping holographic optical element according to the present disclosure.

To estimate the efficiencies η of the recorded beam shaping holographic optical element 715 a transmission spectrum (Perkin Elmer, PE-LA 950 UV-VIS) is taken perpendicular through the beam shaping holographic optical element 715 plane. FIG. 14 shows a diagram with the results of the test. Values for η are taken as the relative depths with respect to the base line of the transmission spectrum at the three reconstructing wavelengths λrec. The following results are obtained:

λrec=642 nm: η=0.39
λrec=528 nm: η=0.27
λrec=484 nm: η=0.22

From these results, it can be seen that a beam shaping holographic optical element 715 is formed which reconstructs RGB light with high and balanced efficiencies.

Figure 15:
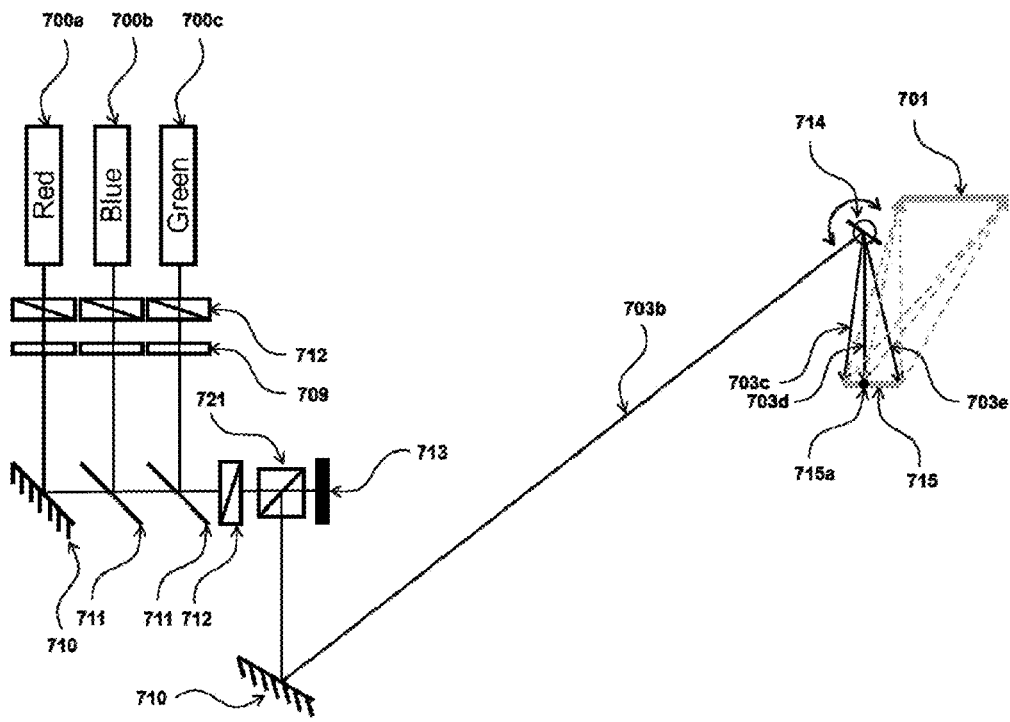
FIG. 15 is a schematic view of a test arrangement for testing the steering properties of the beam shaping holographic optical element according to the present disclosure.

To evaluate the steering properties of the beam shaping holographic optical element 715 the arrangement used for the production of the beam shaping holographic optical element 715 depicted in FIG. 13 is modified as outlined in FIG. 15.

As can be seen from FIG. 15, the beam path used for the reconstruction beam is blocked with a beam dump 713. Furthermore, the microscope objective 730 shown in FIG. 13 is replaced by a rotatable mirror 714 with its rotation centre in the common source point. In addition, the master element 702 is removed from the contact recording stack.

By the arrangement in FIG. 15, in particular due to the arrangement of the rotatable mirror 714, a pencil of laser light, either RGB or monochrome, can be moved at different positions of beam shaping holographic optical element 715 for example with the beams 703*c*, 703*d* and 703*e*. In all these cases the identical real image of the diffusor 701 is reconstructed.

In a next step, the beam shaping holographic optical element 715 is rotated by 90° around the surface normal located at its centre point 715*a*. Once again the pencil of laser light can be moved from the one edge via the centre towards the other edge with the rotatable mirror 714. In all these cases the identical real image of the diffusor 701 is reconstructed.

In other words, the steering quality of the beam shaping holographic optical element 715 according to the present disclosure is high.

To point out the advantages of the method and arrangement according to the present disclosure, a comparative example will be described in detail with the aid of FIGS. 16 to 22.

The desired mode of action of the following beam shaping holographic optical element is identical to that of the beam shaping holographic optical element described for the example mentioned above.

As pointed out hereinbefore, to generate the beam shaping holographic optical element of this example a non-contact copy process is used, i.e. the master element is not arranged in closed-copy distance to the recording element. If such a non-contact copy process is used it could be designed for convenience in such a way that the zero order light that might be transmitted by the master beam shaping holographic optical element during its reconstruction, will not hit the recording element.

Figure 16:
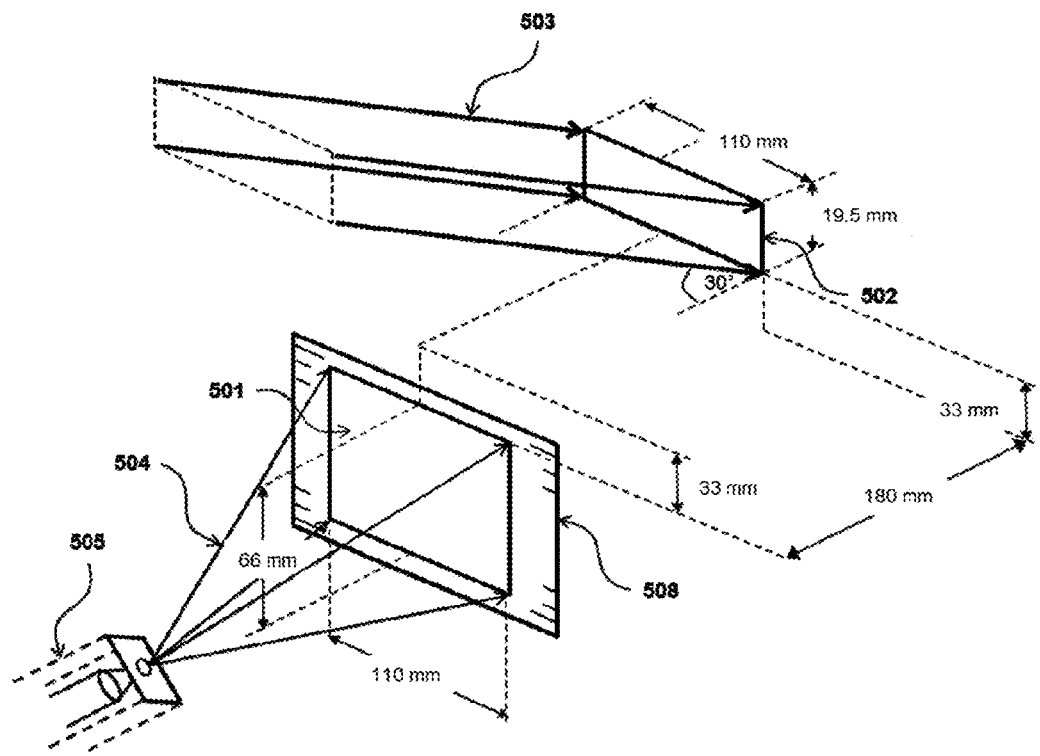
FIG. 16 is a schematic view of an arrangement for generating a master element in form of a master beam shaping holographic optical element according to a comparative example.
Figure 17:
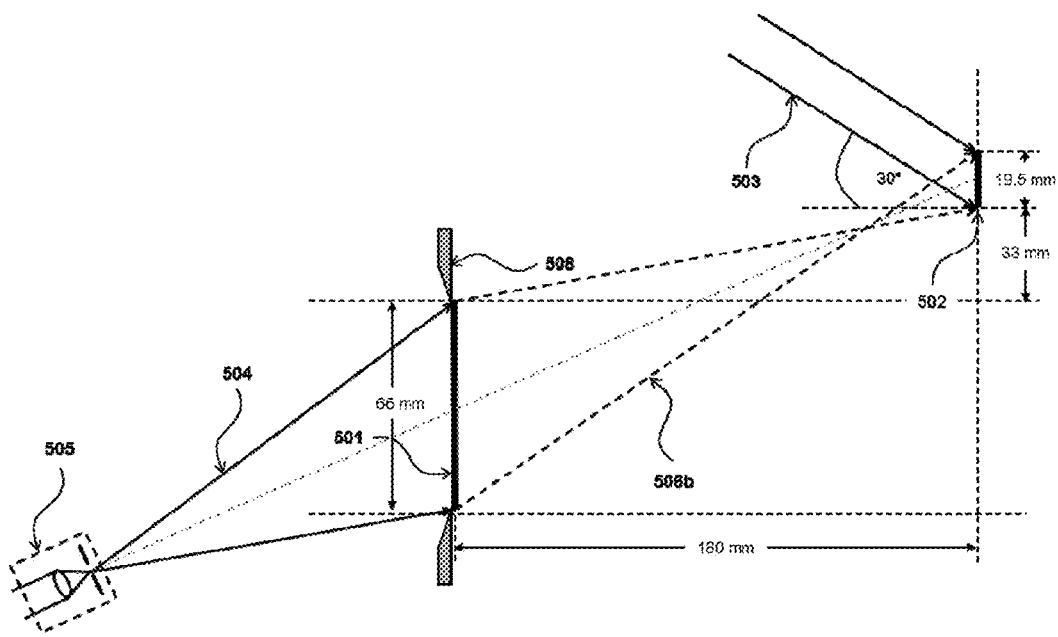
FIG. 17 is a schematic view of a further arrangement for generating a master element in form of a master beam shaping holographic optical element according to the comparative example.

FIG. 16 shows a perspective view (not to scale) of the recording geometry of the transmission type master beam shaping holographic optical element 502. FIG. 17 shows a side view (to scale) of the recording geometry of the same master beam shaping holographic optical element 502. Exemplified dimensions are given in the FIGS. 16 and 17. As a non-contact copy process will be realized the distance of the master beam shaping holographic optical element 502 towards the object 508 has to be increased in a suitable way. Also its vertical size and its vertical positioning towards the object 508 have to be adapted. Otherwise all components for producing this master element 502 can be the same as for the master element used for the above example.

From a common laser light source after a suitable beam splitter the spatial filter 505 generates the divergent illumination beam 504 for the object 501. The object itself is a diffusor sheet (Makrofol® LM 322 2-4, 300 μm thick, made by Bayer MaterialScience AG) made from polycarbonate. The respective opening of 66 mm by 110 mm can be generated by a mask 508 of respective aperture. The optical axis of the illumination light was aligned along the centres of the object 501 and the recording master plate 502. Therefore the diffuse object beam 506*b* generated by the object 501 most effectively covers the area of the recording master plate 502.

A collimated reference beam 503—which is generated by using a folding mirror, as described above—is directed at an angle of 30° on the recording master plate 502 with respect to its surface normal. The active diameter of this folding mirror can be chosen equal to the diameter of the recording master plate 502 as its minimum value. For this example the diameter is equal to 115.43 mm.

The collimated reference beam 503 and the divergent beam 504 are generated from a super-position of red, green and blue laser co-aligned light.

The recording master element 502 is a plate 502 and comprised of a stack of a 3 mm float glass plate with lateral dimension of 90 mm by 120 mm and photopolymer film and a photopolymer film laminated with the photopolymer layer towards the glass surface. The substrate side of the photopolymer film is directed towards the air. The recording layer stack was oriented with the photopolymer film side towards the collimated reference beam 503. That means that the substrate side of the photopolymer film facing the air is the entrance surface for the collimated reference beam 503.

The real image of this transmission type master element 502 is identical to the real image that should be reconstructed by the reflection type beam shaping holographic optical element from FIGS. 7 and 8 if it is illuminated by a pencil of light that emerges from the common source point 203*a* given in FIGS. 7 and 8.

Figure 18:
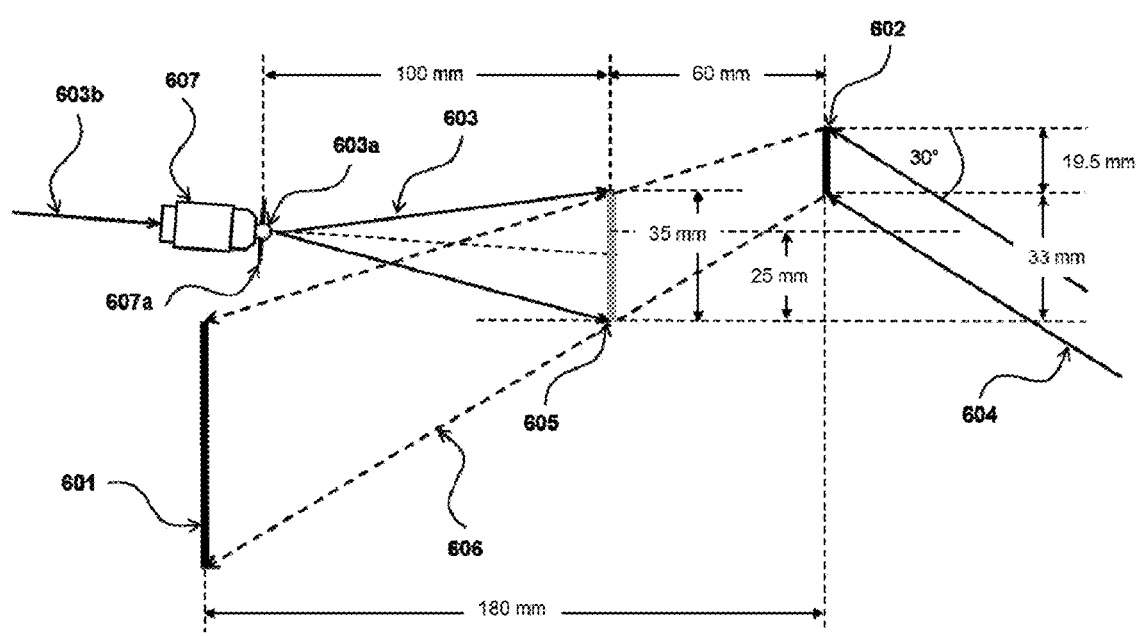
FIG. 18 is a schematic view of an arrangement for producing a beam shaping holographic optical element according to the comparative example.

FIG. 18 shows a side view (to scale) of the non-contact copy recording arrangement of the beam shaping holographic optical element 605. The dimensions of the arrangement are given also in FIG. 18. In comparison to the previous example of the method according to the present disclosure, it can be directly seen from FIG. 18 that the distance between the master element 602 and the recording element 605 is very large (60 mm compared to 120 μm). Hence, the components are not arranged in closed-copy distance.

The collimated reconstruction beam 604, which is the phase conjugated beam of the collimated reference beam 503 from FIGS. 16 and 17, is used to reconstruct the real image 601 of the master element 602 at its desired final position via the diffracted beams 606. The master element 602 is the exposed recording master plate 502 from the master element recording scheme described in connection with FIGS. 16 and 17.

The unexposed recording element 605 and recording plate 605, respectively, is placed at 60 mm distance towards the master element 602 at its side which is opposite to the incident reconstruction beam. Also the bottom edge of the master element 602 is raised about 33 mm above the bottom edge of the unexposed recording element 605. The diffracted beam 606 forms the object beams for the copy process into the recording plate 605.

The divergent reference beam 603 for the copy process is formed from co-aligned red, green and blue unexpanded laser beams via a microscope objective 607 (ZEISS LD Plan-NEOFLUAR 63×/NA=0.75 Korr.) with its focus located in the common source point 603a. It is noted that the numerical aperture of the microscope objective 607 is larger than the numerical aperture of the master element 602. A pin-hole 607a is used to filter the reference beam 603. The optical axis of the microscope objective 607 and therefore that of the divergent reference beam 603 is directed towards the centre of the recording plate 605.

In the present example, the recording plate 605 is comprised of a stack of a 3 mm float glass plate with lateral dimension of 90 mm by 120 mm and photopolymer film and a photopolymer film laminated with the photopolymer layer towards the glass surface. The substrate side of the photopolymer film is directed towards the air.

For the non-contact copying process the photopolymer substrate sides of the recording plate 605 and the master element 602 may face each other. The entrance surface of the reconstruction beam 604 into the master element 602 may be the glass surface of the master element 602 and the entrance surface of the divergent reference beam 603 into the recording plate 605 may be the glass surface of the recording plate 605.

The distance d between the master element 602 and the layer of the recording material used for the recording element 605 is 60 mm. The distance D of the recording element 605 to the common source point of the pencils of light used for reconstruction is 100 mm. The ratio d/D is 0.6 and therefore not in the range of the closed-copy distance defined by the present disclosure.

Figure 19:
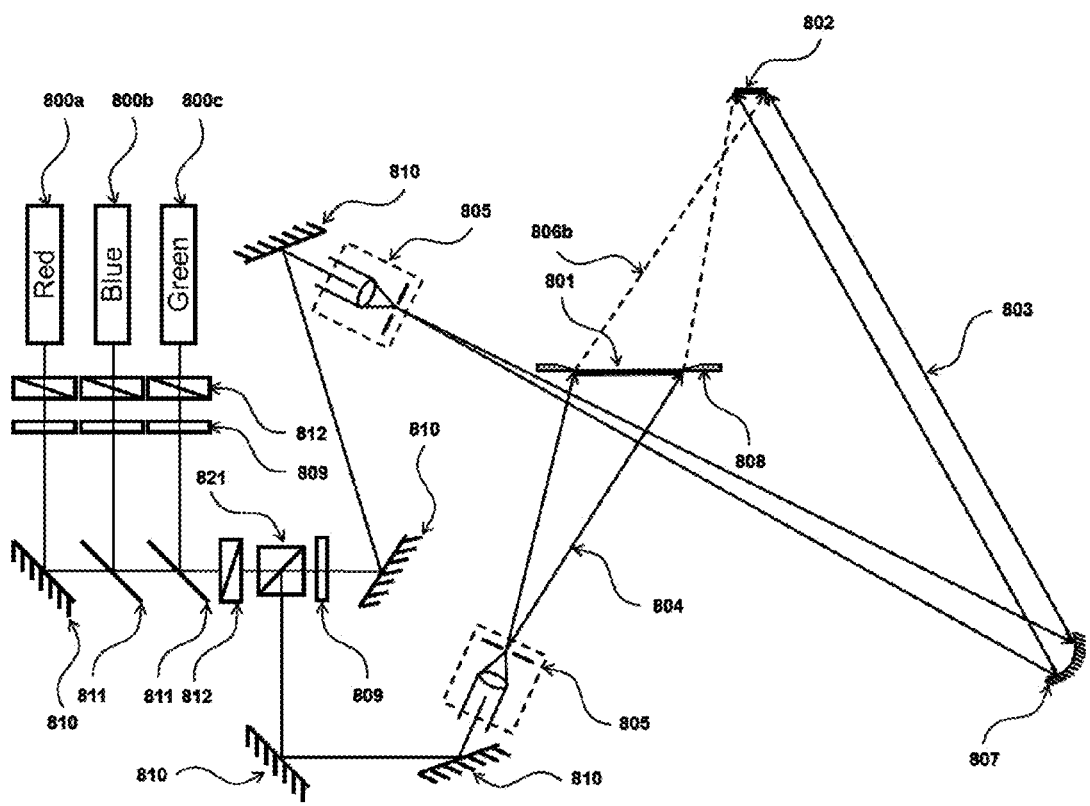
FIG. 19 is a schematic view of a further arrangement for generating a master element in form of a master beam shaping holographic optical element according to the comparative example.

FIG. 19 shows an arrangement for producing a master element in accordance with the comparative example in more detail. The depicted arrangement is similar to the arrangement shown in FIG. 12. For red a Krypton Ion laser (Coherent, Innova Sabre) 800a with a specified output power of 2.1 Watt at 647 nm in single frequency mode is used as a light source. For green a DPSS laser (Coherent Verdi V5) 800b with a specified output power of 5 Watt at 532 nm in single frequency mode is used and for blue an Argon Ion laser (Coherent, Innova 305) 800c with a specified output power of 0.9 Watt at 488 nm is used.

Each laser 800a, 800b, 800c can be blocked by individual shutters 812 which are arranged directly after the laser output. A main shutter 812 is arranged for controlling the simultaneous exposure time texp for all three laser wavelengths. The beam ratios (BR) between the power density of the reference beam Pref and the object beam Pobj of each individual laser wavelength λ can be adapted with the half wave plates 811 located after the individual shutters 812 and the polarizing beam splitter 821. BR is defined as follows:

$$BR = Pref/Pobj \quad (e)$$

Pref and Pobj are measured with photodiode sensors at the location of the recording master plate 802 with the sensor planes aligned parallel to the recording master plate 802. The polarizations of all recording beams were set to S-polarization with respect to the recording table.

In the present example, the three laser beams are co-aligned with the help of one mirror 810 and two diachronic mirrors 811. The reference beam 803 is expanded by a spatial filter 805 and directed on a spherical mirror 807. The mirror 807 has a focal length of 3 m. The pin hole of the spatial filter 805 is placed into the focal point of the spherical mirror. By this the collimated reference beam 803 is generated.

The collimation is confirmed by using a shear beam interferometer (Melles Griot, Shear Plate). The collimated reference beam 803 is directed at a 30° incidence angle towards the surface normal of the recording plate 802. The object wave 806b is generated by the diffusor 801. Thereby, the diffusor 801 is irradiated by the divergent beam 804 emitted by another spatial filter 805. In a practical test, the following recording parameters are used:

λ=647 nm: Pref=34.6 µW/cm2 Pobj=3.0 µW/cm2 BR=11.5

λ=532 nm: Pref=49.8 µW/cm2 Pobj=3.9 µW/cm2 BR=12.9

λ=488 nm: Pref=41.8 µW/cm2 Pobj=3.4 µW/cm2 BR=12.3 texp=75 s

The recorded element 802 is bleached twelve hours on a light box to remove residual coloration from the photoinitiator system.

To estimate the efficiency η the recorded master element 802 is flipped and placed back on the recording plate holder. Then the reference beam 803 is used as reconstruction beam 803. The incident power density Pin is measured for each laser wavelength λ and the diffracted power density Pdiff is also measured for each laser wavelength λ at the position of the real image of the diffusor 801. The efficiency η is then calculated for each λ by following equation:

$$\eta = (Pdiff/Pin) * (\text{Area of the real image of the diffusor})/(\text{Area of the master element}) \quad (f)$$

The following results are calculated:

λ=647 nm: η=0.61

λ=532 nm: η=0.58

λ=488 nm: η=0.66

From the results it can be derived that the produced master element 802 shows balanced efficiencies for all three colours.

Figure 20:
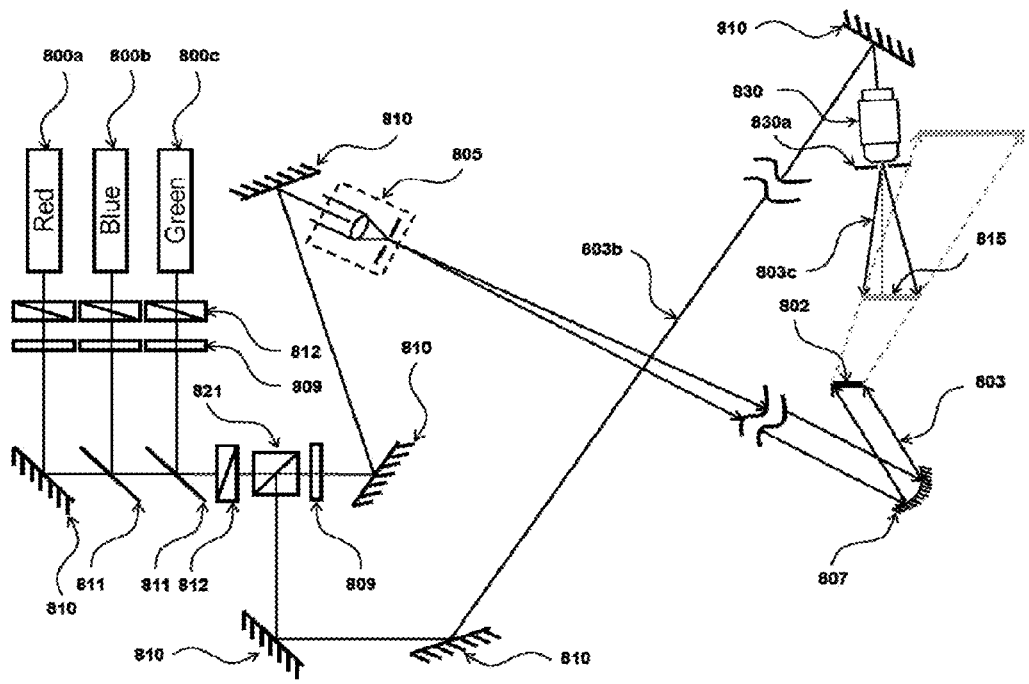
FIG. 20 is a schematic view of a further arrangement for producing a beam shaping holographic optical element according to the comparative example.

FIG. 20 depicts an embodiment for the non-contact copy method for producing a beam shaping holographic optical element in more detail. As like for the estimation of the efficiency of the master element 802 the master element 802 is flipped and mounted in the recording frame. The recording plate 815 is placed with respect to the master element (dimensions are given in FIG. 18) to form the non-contact copy arrangement as described above.

The former reference beam 803 for recording the master element 802 is formed as the reconstruction beam for the master element 802. The beam 803b is directed through the microscope objective 830 and filtered with a pin-hole 830a to from the spherical reference beam 803c for the non-contact copy process. The following recording parameters are used in a practical test:

λ=647 nm: Pref=138.0 µW/cm2 Prec=13.6 µW/cm2 BRC=10.1

λ=532 nm: Pref=217.1 µW/cm2 Prec=18.7 µW/cm2 BRC=11.6

λ=488 nm: Pref=291.4 µW/cm2 Prec=33.8 µW/cm2 BRC=8.6 texp=30 s

The power density of the reconstruction beam Prec at the entrance surface to the recording plate 815 is measured with a photodiode sensor in the centre point of the recording plate 815.

The power density of the reference wave Pref is measured with photodiode sensors at the centre of the opposite entrance surface of the recording plate 815 with the sensor planes aligned parallel to the recording plate 815. The beam ratio of the non-contact copy process is defined as follows:

$$BRC = Pref/Prec \quad (g)$$

The recording plate 815 is bleached twelve hours on a light box to remove residual coloration from the photo-initiator system.

Figure 22:
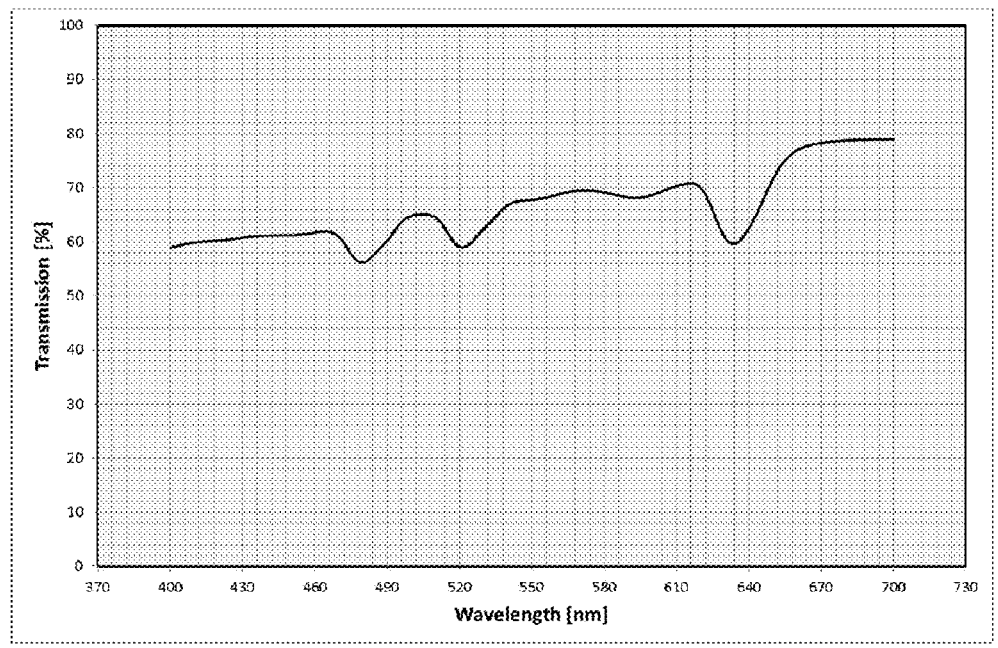
FIG. 22 is a diagram with test results of the beam shaping holographic optical element according to the comparative example.

To estimate the efficiencies $\eta$ of the recorded beam shaping holographic optical element 815 a transmission spectrum (Perkin Elmer, PE-LA 950 UV-VIS) is taken perpendicular through the beam shaping holographic optical element plane. The results are depicted in FIG. 22. Values for $\eta$ were taken as the relative depths with respect to the base line of the transmission spectrum at the three reconstructing wavelengths $\lambda$rec. The following results are determined:

$\lambda$rec=632 nm: $\eta$=0.14
$\lambda$rec=522 nm: $\eta$=0.08
$\lambda$rec=478 nm: $\eta$=0.07

It can be seen from these results that a beam shaping holographic optical element 815 is produced which reconstructs RGB light with good efficiency. However, as will be shown in the following, due to the large distance between recording element 815 and master element 802 during the recording process, the steering abilities of the recording element 815 are rather low.

Figure 21:
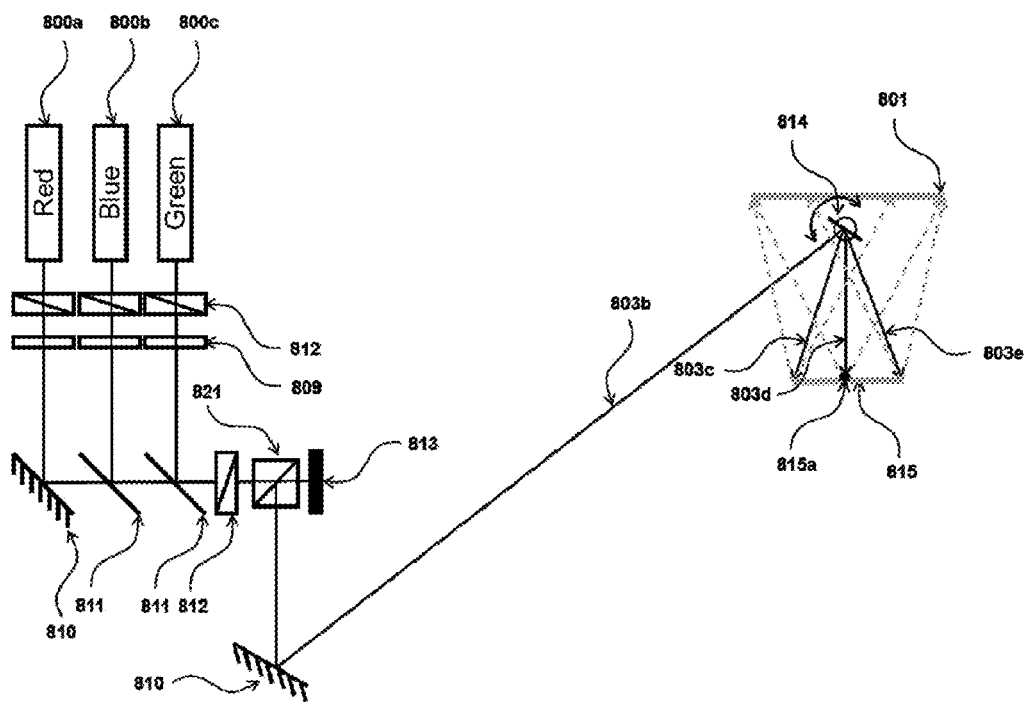
FIG. 21 is a schematic view of a test arrangement for testing the steering properties of the beam shaping holographic optical element according to the comparative example.

To evaluate the steering properties of the beam shaping holographic optical element 815 the arrangement used for the non-contact copy process depicted in FIG. 20 is modified as outlined in FIG. 21. First the beam path used for the reconstruction beam is blocked with a beam dump 813. Second the microscope objective 830 in FIG. 20 is replaced by a rotatable mirror 814 with its rotation centre in the common source point. Third the master element 802 in FIG. 20 is removed from the non-contact copy recording setup.

The arrangement allows that a pencil of laser light, either RGB or monochrome, can be moved at different positions of the beam shaping holographic optical element 815 for example with the beams 803c, 803d and 803e. In all these cases the identical real image of the diffusor 801 is reconstructed. Next the beam shaping holographic optical element 815 is rotated by 90° around the surface normal located at its centre point 815a. Again with the rotatable mirror 814 the pencil of laser light is moved from the one edge via the centre towards the other edge. If the pencil of laser light 803d hits the centre the complete real image of the diffusor is reconstructed. However, if the edges are illuminated with the pencil of laser light 803c and 803e an incomplete real image of the diffusor is reconstructed as depicted in FIG. 21, in which the situation is shown after rotating the beam shaping holographic optical element about 90° around its centre surface normal. Always the far edge part of the real image of the diffusor 801 is missing. In other words, the steering property of the beam shaping holographic optical element 815 cannot be maintained if a non-contact copy process is used.

Figure 23:
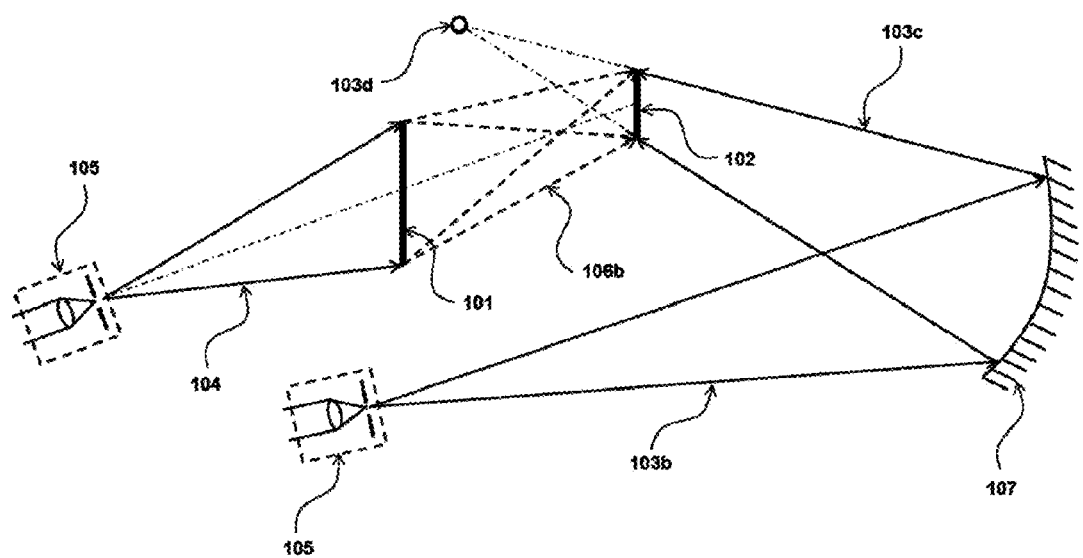
FIG. 23 is a schematic view of a further embodiment of an arrangement for producing a beam shaping holographic optical element according to prior art.

FIG. 23 shows a further embodiment of an arrangement for producing a beam shaping holographic optical element 102 of the reflection type according to prior art. The depicted scheme comprises a convergent recording beam 103b as reference beam 103b, as outlined hereinbefore in connection with FIG. 4 for a transmission type beam shaping holographic optical element. For avoiding repetition, it is referred to the description of FIG. 4.

The only difference to the transmission type beam shaping holographic optical element of FIG. 4 is that the convergent reference beam 103c and the object beam 106b enter from different sides into the recording plate 102 and the recording element 102, respectively. There are still the same drawbacks with respect to large mirror and lens sizes and the high numerical aperture as already mentioned above.

Figure 24:
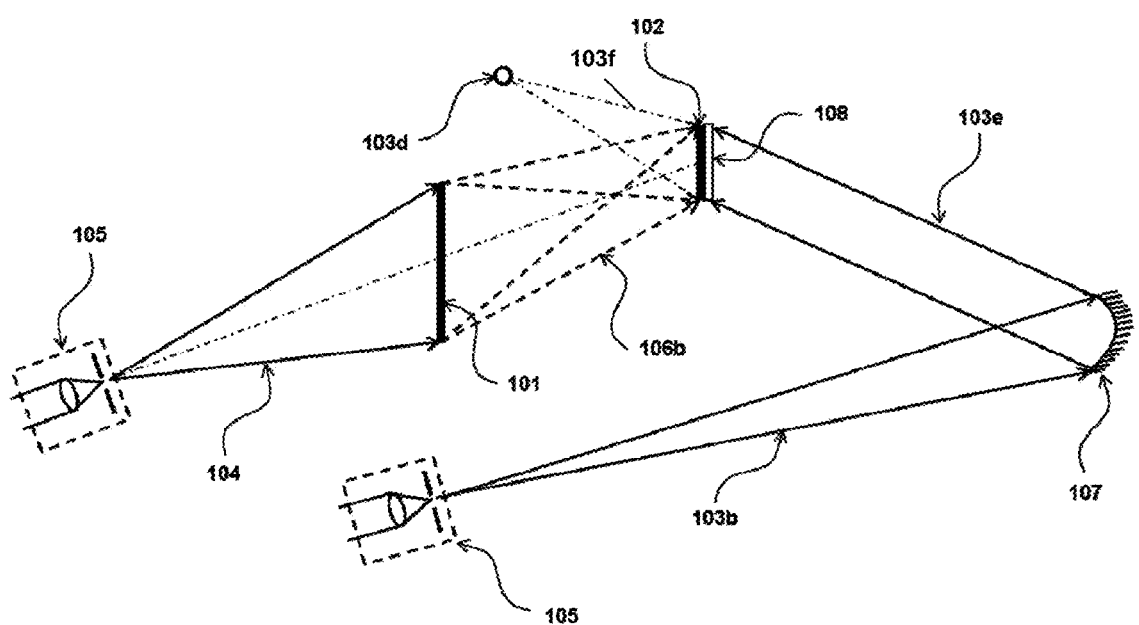
FIG. 24 is a schematic view of a further embodiment of an arrangement for producing a beam shaping holographic optical element according to the present disclosure.

Instead of a master beam shaping holographic optical element, according to a further embodiment of the present disclosure a master element can be realized by a Fresnel zone lens, as shown in FIG. 24. To overcome the necessity of using mirrors or lenses or respective arrays of mirrors and lenses with much larger sizes than the beam shaping holographic optical element itself to form the convergent reference beam a cut-out of the size of the beam shaping holographic optical element of a preferably flat Fresnel zone lens 108 with suitable focal length f can be used. The Fresnel zone lens 108 is thereby arranged in closed-copy distance to the recording plate 102. For instance, the Fresnel zone lens 108 can directly contact the recording element 102.

FIG. 24 shows a schematic view of the arrangement for producing a beam shaping holographic optical element 102 with a Fresnel zone lens 108. As can be seen from FIG. 24, the reconstruction beam path and the reference beam path are identical to the beam recording scheme depicted in FIG. 23. The reference beam path is modified in such a way that the divergent reference beam 103b originating from the spatial filter 105 is now collimated to form the reference beam 103e by a concave mirror 107. The concave mirror 107 is preferably placed at a distance of its focal length f towards the spatial filter 105. It is noted that in this case the concave mirror 107 can be reduced in size to the size of the beam shaping holographic optical element 102 itself due to the used Fresnel zone lens 108.

A first surface of the Fresnel zone lens 108 is irradiated by the beam 103e. The beam 103e penetrates the Fresnel zone lens 108. By penetrating the Fresnel zone lens 108, the reconstruction beam 103f is generated which irradiates the recording plate 102 and runs towards the point at position 103d. It is noted that the point at position 103d is located in the focal plane of the Fresnel zone lens 108.

Also in this case neither a lens or a mirror nor an array of lenses or mirrors used in this recording setup has to exceed in its size the size of the beam shaping holographic optical element 102. The steering property of the produced beam shaping holographic optical element 102 is conserved in this recording setup, as the reference beam is the original convergent beam described in FIG. 23.

On the contrary it might be possible to even abandon the collimating mirror 107, as the pin hole of the spatial filter can be imaged towards the point at position 103d using the lens makers equation $$\frac{1}{O} = \frac{1}{f} - \frac{1}{I} \quad (h)$$

for the distances along the direction of the surface normal of the recording plate 102 and the Fresnel zone lens 108 and the magnification equation $$\frac{h_O}{O} = \frac{h_I}{I} \qquad \text{(i)}$$

for the distances perpendicular to the surface normal of the recording plate 102 and the Fresnel zone lens 108. Whereas O denotes the object distance and I denotes the image distance along the surface normal of the recording plate 102 and the Fresnel zone lens 108 (which forms the optical axis) and f is the focal length of the Fresnel zone lens. hO and hI denotes the object and image height. The imaging has to form a real image. In other words O and I have to be positive numbers. If a collimated beam 103*e* is used the object distance O is positive infinite and therefore the image distance I becomes equal to the focal length f.

However, it might happen that the convergent reference beam 103*c* shows dark fringes in its cross section. It has been found that these fringes result from diffraction of the collimated laser beam 103*e* at the sharp zone edges of the Fresnel lens if no precautions are taken. As these fringes will be recorded into the beam shaping holographic optical element 102 and they might cause unwanted local variations of the diffraction efficiency at steered readout, if for example the cross section of the pencil of light used for readout is smaller than the fringe spacing in the convergent reference beam at the entrance plane to the recording plate 102.

In a further embodiment of the present disclosure the possible deficiencies of the previously explained example can be overcome, if necessary. As outlined hereinbefore in the first embodiment a master beam shaping holographic optical element arranged in closed-copy distance to the recording plate—as defined above—is used to reconstruct the real image of a diffusor through the recording plate. The reference beam is a divergent beam which can be generated easily as outlined in connection with the first example.

Figure 25:
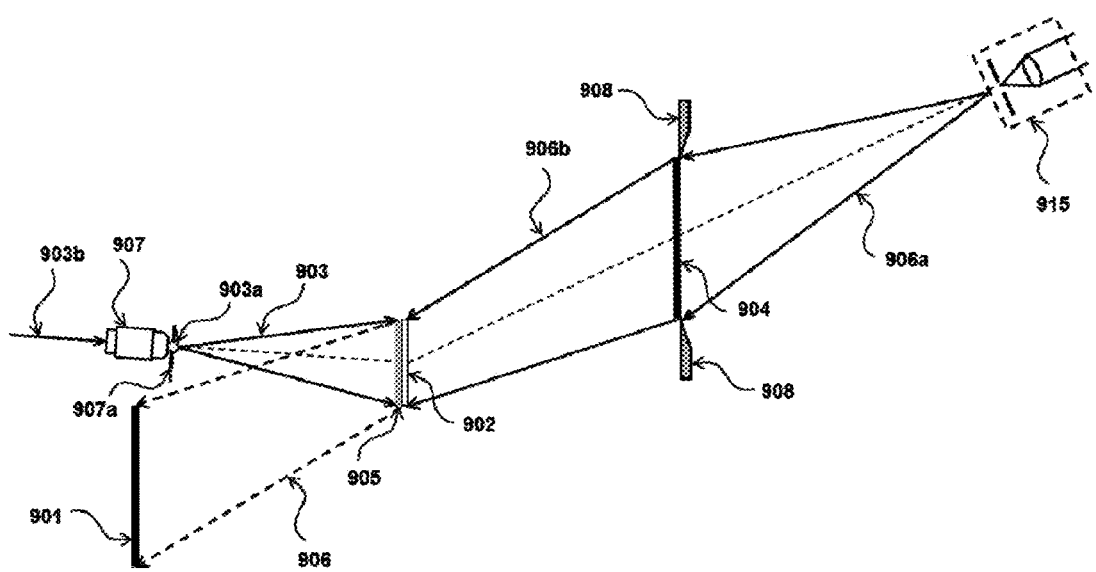
FIG. 25 is a schematic view of a further embodiment of an arrangement for producing a beam shaping holographic optical element according to the present disclosure.

The real image of the diffusor can be generated also by imaging the diffusor by a cut-out of the size of the beam shaping holographic optical element of a flat Fresnel zone lens 900 with suitable focal length f. Such an embodiment is depicted in FIG. 25. In particular, the embodiment is depicted for the case that longitudinal and lateral magnification is equal to 1. This means in terms of the lens makers equation (h) and magnification equation (g) that O=I=f/2.

In this case the diffusor 904 is illuminated by the divergent illumination beam 906*a* which emerges from the pin hole of the spatial filter 915. The scattered light from the diffusor 904 is imaged by the Fresnel zone lens 902 through the recording plate 905 to form the real image of the diffusor 902 via the beam 906. In other words, the reconstruction beam 906*b* illuminates the recording stack comprising the Fresnel zone lens 902 and the recording plate 905. The Fresnel zone lens 902 and the recording plate 905 are in contact or close to contact to each other, i.e. are in closed-copy distance to each other, whereas the Fresnel zone lens 902 faces the diffusor 904.

The reference beam path (903*b*, 907, 903*a* and 903) can now be chosen as a divergent beam 903 as described in the contact copy process in FIG. 11.

Therefore, no lens or mirror or array of lenses or mirrors is required in this recording setup which has to be of larger size than the beam shaping holographic optical element 905 itself. As the generation of the real image of the diffusor through the recording plate 905 via the Fresnel zone lens 902 is completely equivalent to the reconstruction of the real image of the diffusor by the master beam shaping holographic optical element as described in FIG. 11 the steering property of the produced beam shaping holographic optical element is conserved in this recording setup.

Moreover no circular fringes appear in the real image of the diffusor generated by the Fresnel zone lens 902. The real image of a laser beam with circular cross section passing through a diffusor sheet formed by the Fresnel zone lens does not show fringes. Therefore the efficiency of the beam shaping holographic optical element does not show local variations.

A further advantage of the recording setup shown in FIG. 25 is that there is the possibility to magnify a smaller diffusor 904, placed at a shorter distance towards the Fresnel lens 902 to the desired size and location of the real image of the diffusor 901. This allows a lower expansion of the illumination beam 906*a* and therefore less total laser output power and/or higher total power density at the location of the recording plate 905 can be used to facilitate the beam shaping holographic optical element recording. As available total laser power is limited this can facilitate very large size beam shaping holographic optical element recording.

What is claimed is:

1. A method for producing a beam shaping holographic optical element, which is configured to generate diffracted beams configured to reconstruct an image of a diffusor irrespectively of the point of impact of a pencil of light on the beam shaping holographic optical element, comprising:
providing a recording element;
providing a master element comprising a particular pattern;
forming a recording stack comprising the recording element and the master element such that the master element is arranged to the recording element in a closed-copy distance;
irradiating at least a part of the recording stack with a reconstruction beam; and
irradiating at least a part of the recording stack with a reference beam,
wherein at least one of the reconstruction beam or reference beam penetrates the master element to record the pattern of the master element onto the recording element that is positioned outside an image plane of a real image generated by the master element.

2. The method according to claim 1, wherein the reconstruction beam is diffracted by the master element such that the resulting diffracted beam irradiates the recording element.

3. The method according to claim 1, wherein the master element is at least one of:
a beam shaping holographic optical element, and
a Fresnel zone lens.

4. The method according to claim 1, wherein the reconstruction beam is a collimated beam, wherein the reconstruction beam is a phase conjugated beam of a reference beam which has been used for recording the master element, and wherein the reference beam is a divergent beam.

5. The method according to claim 1, wherein the closed-copy distance between the recording element and the master element is less than 0.06 times the distance of the master element to a common source point of the pencils of light used for reconstruction of the pattern.

6. The method according to claim 1, wherein the recording element comprises a photoresist material, photopolymer material, silver halide material, di-chromated gelatine material, photo-chromic material or photo-refractive material.

7. The method according to claim 6, wherein the recording element comprises a photopolymer film comprising a cross-linked matrix and writing monomers.

8. The method according to claim 7, wherein
the recording element comprises a glass plate, and
the photopolymer film is laminated to the glass plate.

9. The method according to claim 8, wherein
the recording element is arranged in the recording stack such that the glass plate of the recording element is irradiated by the reference beam, and
the recording element is arranged in the recording stack such that the photopolymer film of the recording element is irradiated by the diffracted beam.

10. The method according to claim 1, wherein the reference beam and the reconstruction beam are generated by a single light source and a light beam splitter configured to split the beam emitted from the light source into the reference beam and the reconstruction beam.

11. The method according to claim 1, wherein at least one of the reference beam or reconstruction beam is generated by a laser, a laser diode or a directional light source.

12. An arrangement, comprising:
at least one beam source for generating a reconstruction beam and a reference beam,
a recording holder for holding a recording stack comprising a recording element and a master element so that at least a part of the recording stack is irradiated with the reconstruction beam and the reference beam,
wherein the master element is in a closed-copy distance to the recording element, and wherein at least one of the reconstruction beam or the reference beam penetrates the master element to record the pattern of the master element onto the recording element that is positioned outside an image plane of a real image generated by the master element.

13. A beam shaping holographic optical element produced by a process comprising the steps of:
providing a recording element;
providing a master element comprising a particular pattern;
forming a recording stack comprising the recording element and the master element such that the master element is arranged to the recording element in a closed-copy distance;
irradiating at least a part of the recording stack with a reconstruction beam; and
irradiating at least a part of the recording stack with a reference beam,
wherein at least one of the reconstruction beam or the reference beam penetrates the master element to record the pattern of the master element onto the recording element that is positioned outside an image plane of a real image generated by the master element.

14. The beam shaping holographic optical element according to claim 13, wherein the beam shaping holographic optical element is a reflection-type beam shaping holographic optical element, a transmission-type beam shaping holographic optical element or an edge-lit beam shaping holographic optical element or a combination of thereof.

15. A display device comprising a beam shaping holographic optical element produced by a process comprising the steps of
providing a recording element;
providing a master element comprising a particular pattern;
forming a recording stack comprising the recording element and the master element such that the master element is arranged to the recording element in a closed-copy distance;
irradiating at least a part of the recording stack with a reconstruction beam; and
irradiating at least a part of the recording stack with a reference beam,
wherein at least one of the reconstruction beam or the reference beam penetrates the master element to record the pattern of the master element onto the recording element that is positioned outside an image plane of a real image generated by the master element.

16. The display device according to claim 15, wherein the beam shaping holographic optical element is a reflection-type beam shaping holographic optical element, a transmission-type beam shaping holographic optical element or an edge-lit beam shaping holographic optical element or a combination of thereof.

17. The method of claim 1, wherein the filter comprises a member with a pin hole through which a portion of the reference beam passes.

18. The method of claim 1, further comprising bleaching the recording stack for a predetermined amount of time.

19. The method of claim 18, wherein the reference beam and the reconstruction beam are generated by a plurality of lasers, wherein each of the lasers generate light of a different color.

20. The method of claim 1, further comprising:
filtering a reference beam using a filter, wherein at least the part of the recording stack is irradiated with the filtered reference beam; and
wherein a first distance between the recording stack and the image plane is longer than a second distance between the filter and the recording stack.

* * * * *